United States Patent
Yamada et al.

(10) Patent No.: US 6,462,903 B1
(45) Date of Patent: Oct. 8, 2002

(54) DISC-SHAPED RECORDING MEDIUM AND DISC DRIVING SYSTEM

(75) Inventors: Takashi Yamada, Tokyo; Naoto Kojima, Kanagawa; Kazuo Takahashi; Toshio Mamiya, both of Tokyo; Kanzo Okada, Chiba, all of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/509,786

(22) PCT Filed: Jul. 30, 1999

(86) PCT No.: PCT/JP99/04131
§ 371 (c)(1),
(2), (4) Date: Mar. 30, 2000

(87) PCT Pub. No.: WO00/07189
PCT Pub. Date: Feb. 10, 2000

(30) Foreign Application Priority Data

Jul. 31, 1998 (JP) .......................... 10-218365
Jul. 31, 1998 (JP) .......................... 10-218366

(51) Int. Cl.⁷ .................. G11B 17/028; G11B 23/03
(52) U.S. Cl. ................. 360/99.12; 360/98.08; 360/99.05; 360/133
(58) Field of Search .................. 360/98.08, 99.12, 360/99.05, 133, 97.01

(56) References Cited

U.S. PATENT DOCUMENTS 5,317,225 A * 5/1994 Miyaji et al. ............. 360/98.08
5,550,690 A * 8/1996 Boutaghou et al. ....... 360/99.12
5,822,151 A * 10/1998 Albrecht et al. ......... 360/98.08

FOREIGN PATENT DOCUMENTS

| JP | 6-119697 | 4/1994 |
|----|----------|--------|
| JP | 11-66787 | 3/1999 |
| WO | 95/05660 | 2/1995 |

OTHER PUBLICATIONS

International Search Report for PCT Application No. PCT/JP99/04131.
Microfilm of specification & drawings annexed to request of Japanese Utility Model Appln No. 62–55396 (Laid–open No. 63–164862) (Asahi Glass Co., Ltd.).
Microfilm of specification & drawings annexed to request of Japanese Utility Model Appln No. 57–39768 (Laid open No. 58–144669) (Hatachi Maxell, Ltd.).

* cited by examiner

Primary Examiner—Jefferson Evans
(74) Attorney, Agent, or Firm—Ronald P. Kananen, Esq.; Rader, Fishman, & Grauer, PLLC

(57) ABSTRACT

A disc-shaped recording medium for which information signals are recorded and/or reproduced in a state in which a rotating recording and/or reproducing head is floated a pre-set distance from a signal recording region carrying surface of the disc-shaped recording medium. The disc-shaped recording medium has an area radially outside of the outer perimeter of center opening by at least 0.1 mm clamped by a clamp mechanism. This area is coplanar as each surface of the disc-shaped recording medium carrying the signal recording region. It is possible in this manner to prevent eccentricity of the rotating disc-shaped recording medium and consequent collision of the recording and/or reproducing head against the disc-shaped recording medium.

76 Claims, 13 Drawing Sheets

DISC-SHAPED RECORDING MEDIUM AND DISC DRIVING SYSTEM

TECHNICAL FIELD

This invention relates to a disc-shaped recording medium constituted by a substrate molded from a synthetic resin and for which information signals are recorded and/or reproduced in a state in which a recording and/or reproducing head is floated with a pre-set gap from a surface of the disc-shaped recording medium on which has been formed a signal recording region. More particularly, it relates to a disc-shaped recording medium having a center clamp mechanism for clamping a disc rotating driving unit, and to a disc drive device employing this disc-shaped recording medium.

BACKGROUND ART

Up to now, a magnetic disc employing a substrate formed of glass or metal such as aluminum has been used as a disc-shaped recording medium enclosed in an information processing device such as a personal computer and which is used as a storage device. This magnetic disc is mounted for rotation in unison with a rotating unit by having a rotating unit of the disc rotating driving unit clamped by a center clamping mechanism provided centrally of the disc. The information signals are recorded and/or reproduced on or from a magnetic disc run in rotation in unison with the rotating part of the disc rotating driving unit by a magnetic head supported by a head slider mounted on the distal end of an elastically deformable supporting arm. In recording and/or reproducing information signals on or from a rotationally driven magnetic disc, the magnetic head scans a recording track formed on the signal recording region as the magnetic head is floated at a pre-set gap from the surface carrying the signal recording region.

Meanwhile, the magnetic head scanning this type of the magnetic disc scans the signal recording region of the magnetic disc with a small float from the surface of the magnetic disc carrying the signal recording region. The amount of float of the magnetic head from the magnetic disc needs to be kept constant so that the strength of the magnetic field applied to the magnetic disc or the strength of the magnetic field detected on scanning the signal recording region of the magnetic disc will be constant. On the other hand, a constant amount of float needs to be maintained in order to prevent the magnetic head from colliding against the rotationally driven magnetic disc.

Thus, the magnetic disc needs to be maintained and clamped in a highly accurate horizontal position on the disc rotating driving unit, such that the magnetic disc needs to be assembled in such a condition that the clamp mechanism for clamping the magnetic disc relative to the disc rotating driving unit and the magnetic disc are kept in a horizontal position to high accuracy.

On the other hand, when the magnetic disc is run in rotation as it is clamped to the disc rotating driving unit, the magnetic disc needs to be run in rotation without offset in order to scan the recording track accurately by a floated magnetic head. The clamping mechanism is mounted on the magnetic disc, as the clamping mechanism holds the perimeter of a center aperture of the magnetic disc with a force sufficient to prohibit the magnetic disc from being offset in the direction along the rotational axis and along the radius of the magnetic disc, in order to prohibit the disc from being offset during rotation.

As for a magnetic disc, used as a recording medium for the information processing device, such as a personal computer, such a magnetic disc which employs a substrate molded from a synthetic resin is furnished in large quantities in place of a glass or metal substrate, in order to reduce production cost and in order to enable high-density recording of information signals. In the magnetic disc employing a substrate of synthetic resin, in which a string of pits, such as those for servo signals, can be formed by injection molding, using a stamper, it is possible to produce large quantities of the discs of high recording density inexpensively as compared to the glass or aluminum discs. On the other hand, this sort of the magnetic disc, employing a substrate of synthetic resin, is lower in tenacity than the magnetic disc of glass or aluminum. The magnetic disc, employing a substrate of synthetic resin, tends to be contracted or deformed due to changes in the environmental temperature to which the magnetic disc is exposed. Also, since the magnetic disc is formed by injection molding, thermal contraction occurs on cooling to form projections on the inner or outer rims to affect the planarity of the disc surface.

If a clamp mechanism used for a magnetic disc employing the substrate formed of high-melting glass or metals, such as aluminum, is directly used for the magnetic disc employing the substrate formed of synthetic resin, the following problems arise: First, since the magnetic disc employing the substrate formed of synthetic resin is lower in tenacity than the magnetic disc formed of glass or metals,.such as aluminum, the firstly-stated magnetic disc is locally deformed or warped in a direction along its thickness if a large load is applied by the clamping mechanism in a direction along the rotary axis.

Also, with the magnetic disc employing the substrate formed of synthetic resin, a projection of a minute size is produced on its inner rim provided with the center opening during the substrate manufacture. If the portion formed with the projection is gripped by the clamp mechanism, partial load is applied to the magnetic disc, thus affecting planarity after mounting the clamp mechanism.

Moreover, the magnetic disc employing the substrate formed of synthetic resin undergoes expansion or contraction due to changes in the environmental temperature. At this time, the contact portion between the clamp mechanism and the magnetic disc is subjected to offset due to such expansion or contraction, thus deforming the magnetic disc.

That is, the magnetic disc employing the substrate formed of synthetic resin is subjected to clamp position offset, due to chronological deterioration, even if the clamp mechanism is mounted to high precision, thus affecting the planarity.

In particular, with the magnetic disc on which information signals are recorded to high density, the magnetic head is moved to a position extremely close to the magnetic head during recording and/or reproduction of the information signals on or from the disc. Thus, it may be an occurrence that the magnetic disc collides against the magnetic disc if the magnetic disc is worsened in planarity.

DISCLOSURE OF THE INVENTION

It is an object of the present invention to provide a disc-shaped recording medium formed of synthetic resin in which a clamp mechanism can be mounted, as high planarity of the disc-shaped recording medium is kept, and in which the planarity may be maintained after mounting the clamp mechanism, and a disc drive device employing this disc-shaped recording medium.

It is another object of the present invention to provide a clamp mechanism that is able to clamp a disc-shaped recording medium as the disc-shaped recording medium is maintained in a state of high planarity, and a disc drive device employing this clamp mechanism.

For accomplishing the above objects, the present invention provides a disc-shaped recording medium including a substrate molded from a synthetic resin with a center opening, in which a signal recording region is formed on at least its one surface, and in which information signals are recorded and/or reproduced in a state a rotating recording and/or reproducing head is floated a pre-set distance from the surface carrying the signal recording region. The disc-shaped recording medium includes a clamp mechanism provided with a supporting member arranged on one of the surfaces of the disc-shaped recording medium for supporting the one surface around the center opening and with a thrusting supporting member arranged on the other surface of the disc-shaped recording medium for supporting the other surface around the center opening. The clamp mechanism is mounted on the disc-shaped recording medium as it clamps an area of the disc-shaped recording medium radially outside of the outer perimeter of center opening by at least 0.1 mm. This area is coplanar as each surface of the disc-shaped recording medium carrying the signal recording region.

A disc-shaped recording medium according to the present invention includes, between a contact portion of a thrusting supporting member constituting a clamp mechanism and a disc-shaped recording medium, a load concentration releasing member for releasing the load concentration of the thrusting supporting member.

The clamp mechanism includes, between the supporting member and the thrusting supporting member, an intermediate member arranged in the center opening of the disc-shaped recording medium. There is formed a gap between the intermediate member and the center opening for prohibiting the intermediate member from colliding against the lateral side of the center opening when the disc-shaped recording medium is contracted to reduce the size of the center opening.

A disc drive apparatus according to the present invention includes a disc-shaped recording medium provided with a substrate with a center opening, molded from a synthetic resin, and including a signal recording region formed on at least its one surface, a clamp mechanism including a supporting member arranged on one of the surfaces of the disc-shaped recording medium, by having a center shank passed through the center opening, for supporting an area of the one surface around the center opening, and with a thrusting supporting member arranged on the other surface of the disc-shaped recording medium for supporting an area of the other surface around the center opening. The disc rotating driving mechanism is formed as-one with the clamp mechanism carrying the disc-shaped recording medium for rotationally driving the disc-shaped recording medium, and includes a recording and/or reproducing head for performing recording and/or reproduction as it is floated a pre-set distance from a surface provided with a signal recording region of the rotating disc-shaped recording medium. The clamp mechanism is mounted on the disc-shaped recording medium as it clamps an area of the disc-shaped recording medium radially outside of the outer perimeter of center opening by at least 0.1 mm. This area is coplanar as each surface of the disc-shaped recording medium carrying the signal recording region.

Other objects and advantages of the present invention will become apparent from the following description which is made with reference to the accompanying drawings.

BRIEF DESCRIPTION OF THE DRAWINGS

FIG. 11 is a cross-sectional view showing the state in which a magnetic disc has been mounted on a hub mechanism.

BEST MODE FOR CARRYING OUT THE INVENTION

Figure 1:
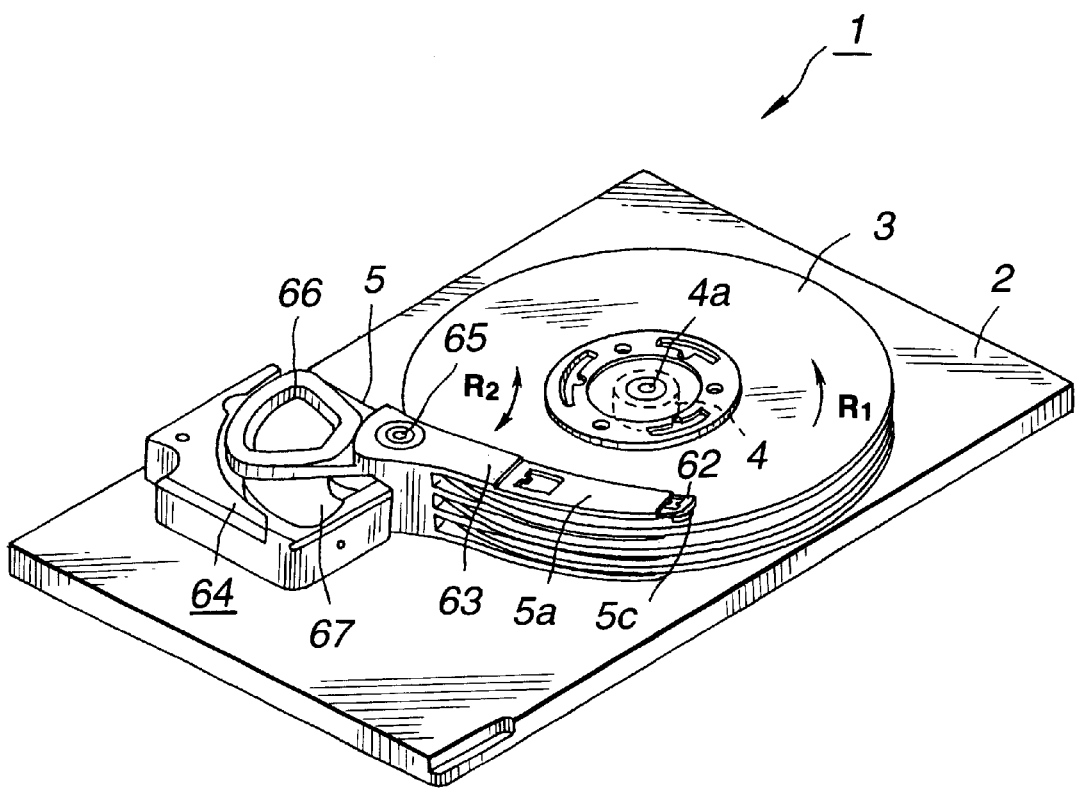
FIG. 1 is a perspective view showing a magnetic disc device embodying the present invention.

Referring to the drawings, certain specific embodiment of the present invention will be explained in detail.

In the following description, the present invention is applied to a magnetic disc and a disc drive device employing this magnetic disc.

Turning to the disc drive device employing a magnetic disc 3 according to the present invention, this disc drive device is enclosed in an information processing apparatus, such as a personal computer, or is used as an external storage device for the information processing apparatus.

Figure 2:
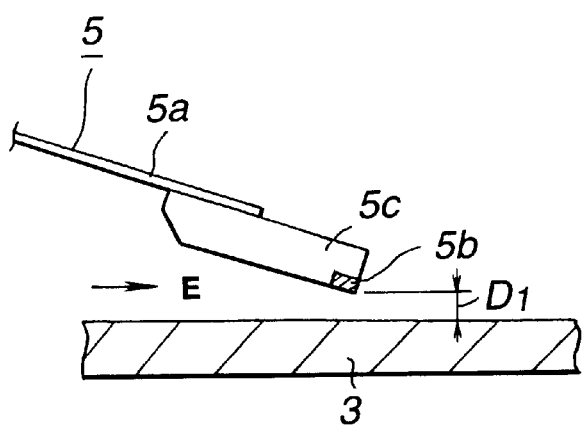
FIG. 2 is a cross-sectional view showing the state in which the magnetic head is recording and/or reproducing a magnetic disc.

Referring to FIG. 1, this disc drive device 1 includes a base member 2, formed by a plate of metal, such as an aluminum alloy. This base member 2 includes a plurality of magnetic discs 3, rotationally driven by a spindle motor 4 and adapted for carrying thereon information signals, such as the information processed by a computer, or the program information to be processed by the computer, and a magnetic head device 5 adapted for recording information signals on the magnetic disc 3 or reproducing the information signals recorded on the magnetic disc 3. In this disc drive device, if the magnetic disc 3 is run in rotation in a direction indicated by arrow R1 in FIG. 1, by the spindle motor 4 of the disc rotating driving unit, the magnetic head device 5 is run in rotation along the direction of the radius of the magnetic disc 3 for recording and/or reproducing information signals, The magnetic head 5, used here, has a head slider 5c as-one with a head element 5b, on the distal end of a head supporting arm 5a, formed by, for example, an elastically deformable plate spring. When the magnetic disc 5 is facing the surface of the rotating magnetic disc carrying the signal recording region, the head slider 5c is floated from the magnetic disc 3, under the effect of an air current E generated between the magnetic disc 3 and the head slider 5c, as shown in FIG. 2. By the floating of the head slider 5c, the head slider 5c scans the signal recording region as the head element 5c is floated by a pre-set distance D1 from the signal recording region carrying surface, so as not to be contacted with the magnetic disc 3.

Figure 3:
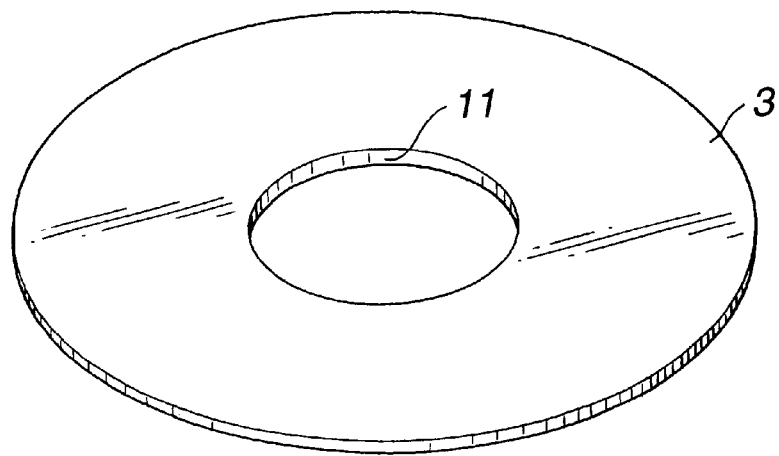
FIG. 3 is a perspective view of a magnetic disc.

The magnetic disc 3 according to the present invention includes a signal recording magnetic layer on one or both surfaces of the disc substrate 10, obtained on molding the synthetic resin, having an outside diameter of 2.5 inch, as shown in FIG. 3. This magnetic disc 3 has a center opening 11 passed through by an intermediate portion or a shank 22 of a clamp mechanism 21 run in rotation with a driving shaft of the spindle motor 4. This center opening 11 is selected to be slightly larger than the diameter of a shaft 22 of the clamp mechanism 21 run in rotation in unison with the driving shaft of the spindle motor 4.

Figure 4:
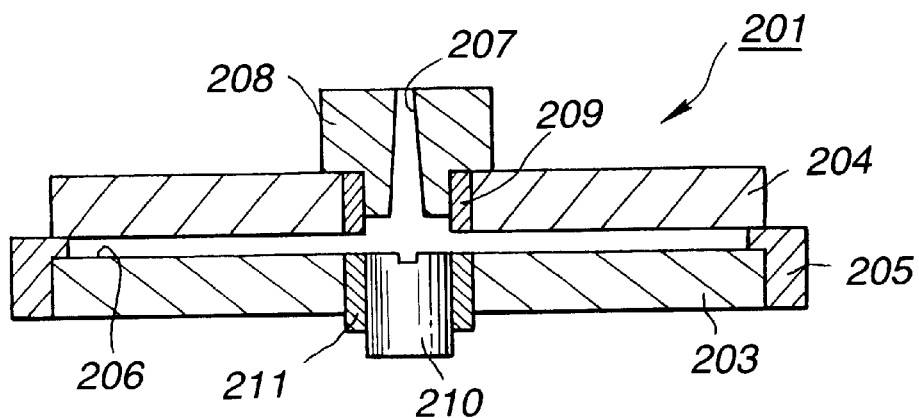
FIG. 4 is a cross-sectional view of a metal mold device used for manufacturing a magnetic disc embodying the present invention.

Meanwhile, the disc substrate 10 of synthetic resin, constituting this magnetic disc 3, is molded using an injection molding device 201 shown in FIG. 4. The injection molding device 201 includes a fixed metal mold 203 for molding one of the major surfaces of the disc substrate 10, a movable metal mold 204 for molding the other major surface of the disc substrate 10, and an outer peripheral metal mold 205 for molding the outer lateral surface of the disc substrate 10, as shown in FIG. 4. The fixed metal mold 203, movable metal mold 204 and the outer peripheral metal mold 205 in the clamped state delimit a cavity 206 in which is charged the synthetic resin.

The injection molding device 201 includes, on the side of the fixed metal mold 203, a sprue 208 with a nozzle 207 operating as a path for synthetic resin, and a sprue bushing 209. The injection molding device 201 includes, on the side of the movable metal mold 204, a punching member 210 for boring a center opening 11 in the disc substrate 10 and an ejection member 211 for recovering a cured disc substrate 10.

For molding the disc substrate 10 by the injection molding device 201, the fixed metal mold 203 and the movable metal mold 204 are kept open, and the movable metal mold 204 is driven to clamp the fixed metal mold 203 and the movable metal mold 204 in a mold clamping state. In this state, the fixed metal mold 203, movable metal mold 204 and the outer peripheral metal mold 205 define the cavity 206 in which to charge the synthetic resin.

Figure 5:
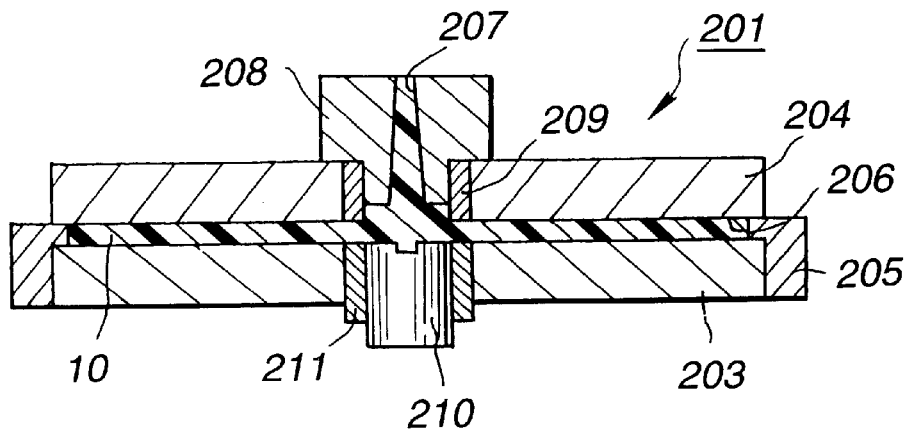
FIG. 5 is a cross-sectional view showing the state in which a synthetic resin in the molten state has ben charged into the metal mold device.

The synthetic resin in the heated molten state is then poured from the nozzle 207, as shown in FIG. 5. At this time, air is introduced from an interstice between the fixed metal mold 203 and the sprue 208 to establish a predetermined pressure in the cavity 206. By introducing air into the cavity 206 to establish the predetermined pressure therein, a highly planar signal recording region forming surface is formed by the planar surface formed on the surfaces of the fixed metal mold 203 and the movable metal mold 204 defining the cavity 206.

The center opening 11 of the disc substrate 10 in the molten state then is formed by the punching member 210. Since the punching member 210 is intruded at this time into the sprue bush 209, there is generated the friction between the punching member 210 and the sprue bush 209. The sprue bush 209 is arranged between the sprue 208 and the fixed metal mold 203 in order to cope with this friction by exchange of component parts.

Figure 6:
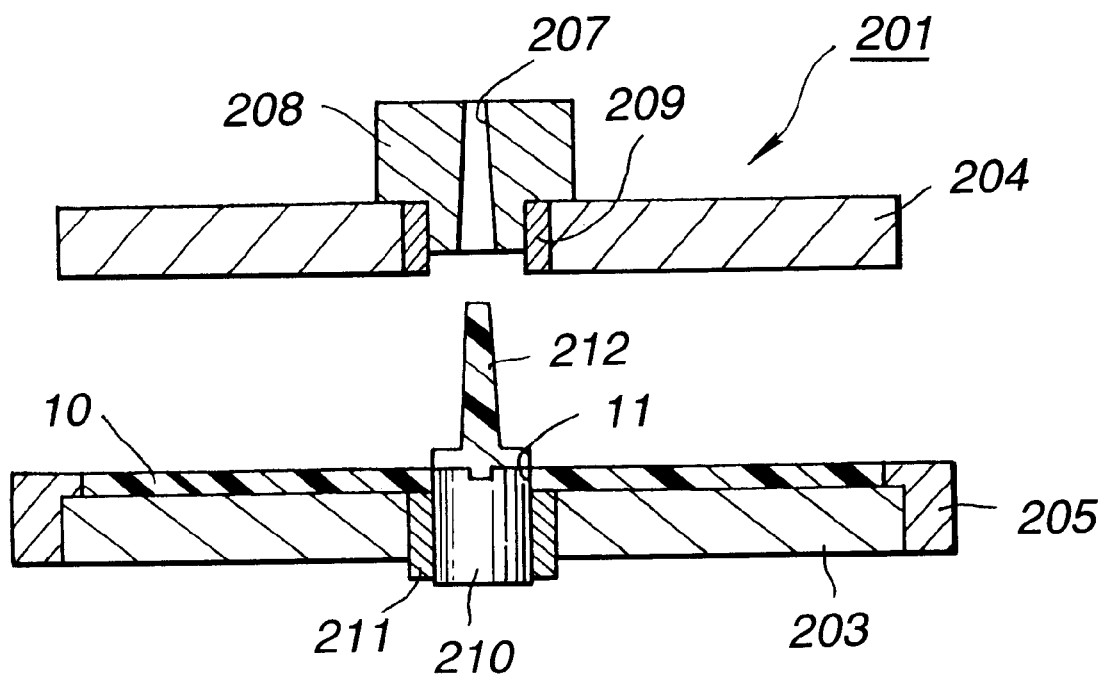
FIG. 6 is a cross-sectional view of a metal mold device in which a fixed metal mold has been separated from a movable metal mold.
Figure 7:
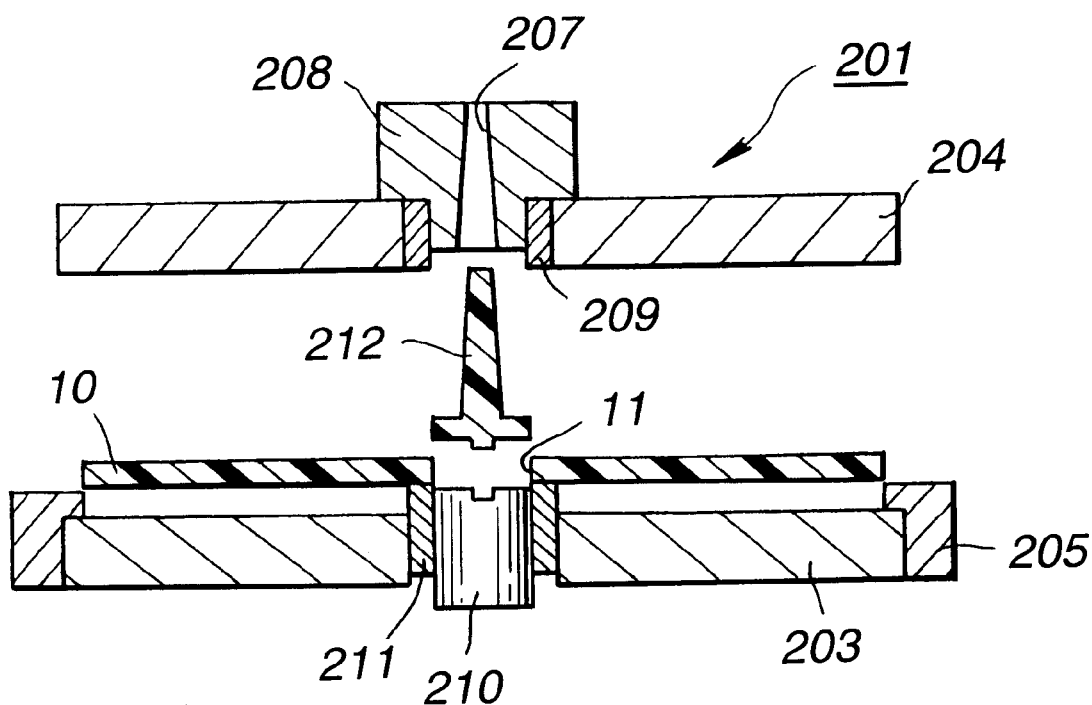
FIG. 7 is a cross-sectional view of a metal mold device in which the inner rim of a hardened disc substrate has been extruded by an ejecting member.

The synthetic resin, charged into the cavity 206, then is allowed to cool to cure the synthetic resin charged into the cavity 206. The movable mold 204 then is actuated and moved away from the fixed mold 203 to open the injection molding device 201, as shown in FIG. 6. The inner rim of the cured disc substrate 10 then is pushed by the ejection member 211 and taken out to complete the disc substrate 10, as shown in FIG. 7. The portion punched off by the ejection member 211 to form the center opening 11 is separated as punching waste scraps 212 from the disc substrate 10.

Figure 8:
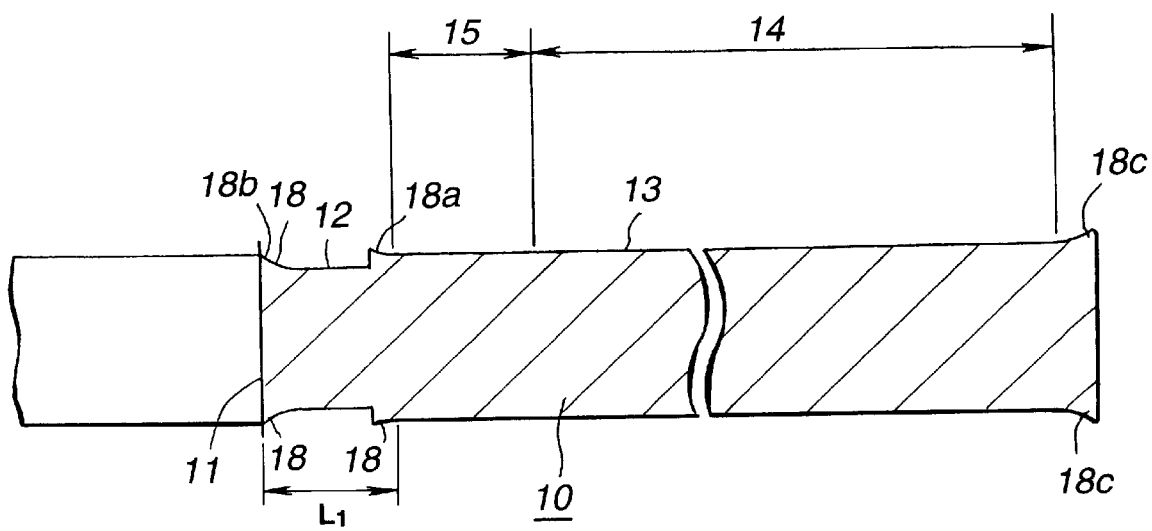
FIG. 8 is a schematic cross-sectional view showing a magnetic disc.

The above-described disc substrate 10, molded by the injection molding device 201, includes a thin-walled portion 12, having a center opening 11, and a main body portion of the disc substrate 13 formed on the outer rim of the thin-walled portion 12 and which is provided with a recording area 14 for recording the information, as shown in FIG. 8. The thin-walled portion 12 is an area against which compresses the ejection member of the injection molding device 201. The main body portion of the disc substrate 13 includes a signal recording region 14 in which to record information signals, a non-signal recording region on an inner rim side, in continuation to the signal recording region 14, and a planar clamp region 15 in the non-signal recording region adapted to be supported by the clamp mechanism 21, as shown in FIG. 8. The clamp region 15 is co-planar as the signal recording region 14 and is clamped by the clamp mechanism 21. Meanwhile, the clamp region 15, carried by the clamp mechanism 21, is provided towards an outer rim by not less than 0.1 mm from the rim of the center opening 11 of the magnetic disc 3, such that the clamp region 15 is formed for extending from a position 0.25 mm to a position 0.8 mm from the rim of the center opening 11. The clamp region 15 is formed so as to have a vertically symmetrical cross-section. The surface of the clamp region 15 is formed to a smooth surface by e.g., polishing, to permit smooth sliding on extension or contraction due to temperature changes of the clamp region 15. For example, the clamp region 15 is formed to have a surface roughness not larger than 0.4 μm in terms of Rmax or to have a surface roughness of not larger than 4 μm at the maximum.

Meanwhile, a metal mold device of an injection molding device 201, adapted to mold the disc substrate 10 having a center opening 1, includes an ejection member 211 for boring the center opening 1, adapted for reciprocation in the cavity 206, at the center of the fixed metal mold 203, as shown in FIG. 4. Moreover, the ejection member 211 is arranged for reciprocation relative to the cavity 206 for surrounding the ejection member 211. If the movable member is arranged in the fixed metal mold 203 for reciprocation, the entire surface of the molding surface of the fixed metal mold 203 cannot be planarized to high precision. That is, from the reason of machining precision of the ejection member 211 and the ejection member 211, the end face of the ejection member 211 cannot be made continuous to the molding surface of the fixed metal mold 203 to high precision. In particular, if the ejection member 211 is formed of a material different from the material of the fixed metal mold 203, there is produced a minute step difference in the boundary between the end face of the ejection member 211 and the molding surface of the fixed metal mold 203.

In the metal mold device of the injection molding device 201 for molding the disc substrate 10 having the center opening 11, synthetic resin is injected into a portion punched for forming the center opening 11. The reason is that a merit is derived that the disc substrate 10 can be molded in a region less susceptible to variations in the injection pressure of the synthetic resin injected into the cavity 206 to enable the region susceptible to variations in the injection pressure. With this in mind, a sprue 208 having a nozzle 207 is provided at center portion of the movable metal mold 204 where the center opening 11 of the disc substrate 10 to be molded is formed. For mounting the sprue 208 on the movable metal mold 204, the sprue bushing 209 is required. If the sprue bushing 209 is provided, the entire molding surface of the movable metal mold 204 cannot be planarized to high accuracy. From the machining precision of the movable metal mold 204 and the sprue bushing 209, the end face of the sprue bushing 209 cannot be made continuous to high precision to the molding surface of the movable metal mold 204, as in the case of the provision of the ejection member 211 on the fixed metal mold 203. In particular, if the sprue bushing 209 and the movable metal mold 204 are formed by molding of different materials, there is produced a minute step difference between the end face of the sprue bushing 209 and the molding surface of the movable metal mold 204.

If the disc substrate 10 is molded by a metal mold device made up a fixed metal mold 203 and the movable metal mold 204, there is produced a minute projection 18a in a boundary region between the thin-walled portion 12 molded by the ejection member 211 and the sprue bushing 209 and the main body portion of the disc substrate 13 provided with a signal recording region for information signals molded by the molding surfaces of the fixed metal mold 203 and the movable metal mold 204.

Figure 9:
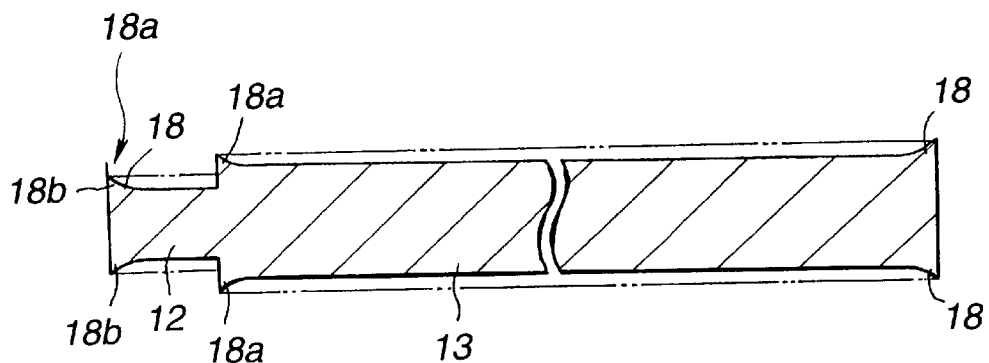
FIG. 9 is a cross-sectional view for illustrating the projection formed on the magnetic disc.

Meanwhile, there are produced similar minute projections 18b, 18c on the perimeter of the center opening 11 and on the outer periphery of the main body portion of the disc substrate 13, as shown in FIGS. 8 and 9.

Since the minute projection 18a are inevitably produced on the boundary surface between the thin-walled portion 12 and the main body portion of the disc a substrate 13, the ejection member 211 and the sprue bushing 209 are formed to diameters such that the ejection member 211 and the sprue bushing 209 do not influence the molding operation of the main body portion of the disc substrate 13 having the signal recording region 14. However, the boundary area between the end face of the ejection member 211 or the molding surface of the movable metal mold 204 cannot be positioned within 0.1 mm from the rim of the center opening 11. That is, the minute projection 18a on the boundary between the thin-walled portion 12 and the main body portion of the disc substrate 13 is produced in a region L1 which is within at least 0.1 mm from the center opening 11. Because of the minute projection 18a, thus formed on the inner periphery of the disc substrate 10, as shown in FIGS. 8 and 9, the inner periphery of the disc substrate 10 cannot be formed to a planar surface continuing to high precision to a surface of the main body portion of the disc substrate 13 carrying the signal recording region 14 of the main body portion of the disc substrate 13.

Thus, according to the present invention, a clamp area 15 adapted for being supported by the clamp mechanism 21 is provided in a portion not less than 0.1 mm away from the rim of the center opening 11 where the disc surface is planar to high precision in continuation to the surface of the main body portion of the substrate 13 provided with the signal recording region 14, as shown in FIG. 8. This clamp region 15 is provided in an area of the disc substrate 10 which is 0.25 mm to 0.8 mm spaced apart from the rim of the center opening 11.

Since the clamp area 15 supported by the clamp mechanism 21 is formed in a common planar area continuing to high precision to the signal recording region 14 of the main body portion of the disc substrate 13, the disc surface may be kept in a planar state even after mounting the clamp mechanism 21.

Figure 10:
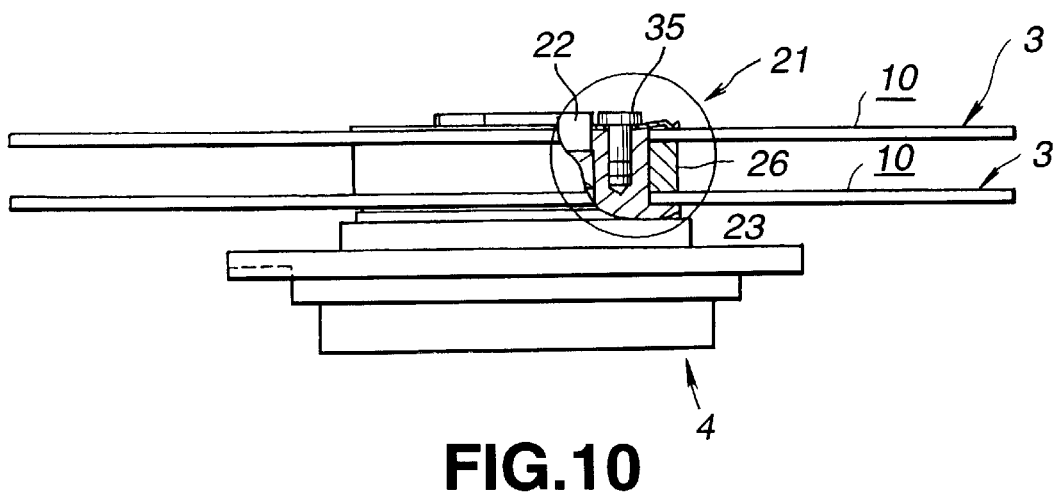
Figure 11:
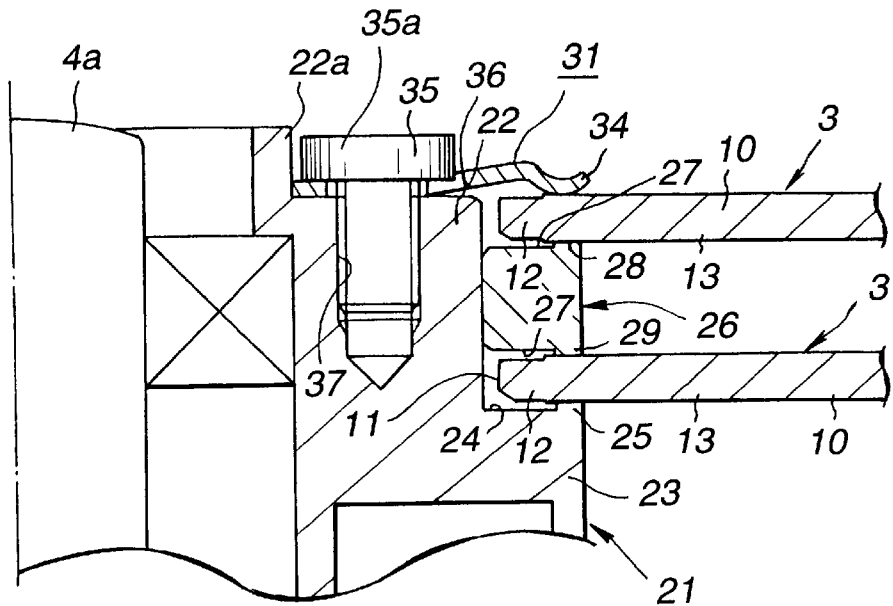
FIG. 11 is a side view of a magnetic disc device.
Figure 12:
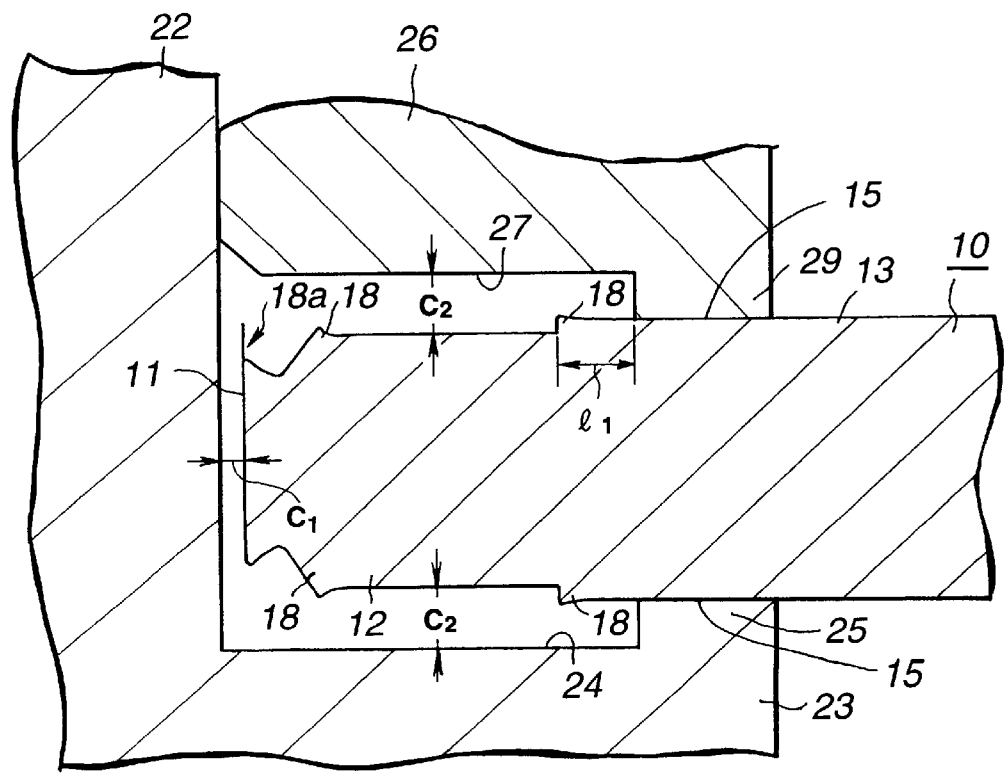
FIG. 12 is an enlarged cross-sectional view showing the state in which a magnetic disc has been mounted on a hub mechanism.

It is noted that plural magnetic discs 3 are supported on a driving shaft 4a of a spindle motor 4 via clamp mechanism 21 on a driving shaft 4a of the spindle motor 4 for rotation in unison with the driving shaft 4a, as shown in FIGS. 10 and 11. The clamp mechanism 21 for mounting the magnetic disc 3 on the driving shaft 4a of the spindle motor 4 includes a shaft 22 constituting a disc supporting member, rotated in unison with the driving shaft 4a of the spindle motor 4, as shown in FIGS. 10 and 11. That is, a gap C1 is defined between the outer peripheral surface of the shank 22 and the lateral surface of the center opening 11, as shown in FIG. 12. Since the magnetic disc 3 is formed of a synthetic resin material, this gap C1 operates for prohibiting the lateral surface of the center opening 11 and the outer peripheral surface of the shank 22 from conflicting against each other when the magnetic disc 3 is contracted by temperature changes until the center opening 11 is contracted to the maximum extent to prevent the magnetic disc from becoming warped.

Specifically, the gap C1 can be calculated in the following manner. In the following, it is assumed that the magnetic disc 3 has an outside diameter of 2.5 inch.

It is first assumed that the diameter of the center opening 11 is equal to the outside diameter of the shank 22. The difference in elongation $(\lambda-\lambda h)$ on temperature change from the initial temperature t0 to t is given by the following equation:

$$(\lambda d-\lambda h)=L\cdot(\alpha d-\alpha h)\cdot(t-t_0)$$

where L: diameter of the center opening 11=outside diameter of the shank 22=25 mm αd (elongation of the center opening): linear expansion coefficient of the magnetic disc $3=7 \times e^{-c} [1/^\circ C.]$ αh (outside diameter of the shank 22): linear expansion coefficient of the shank $22=2.3 \times e^{-5} [1/^\circ C.]$.

If the assumed temperature range is +5° C. to +55° C., the difference in elongation from the elongation at room temperature (+20° C.) can be calculated from the above equation (1):

[temperature change from +20° C. to +5° C.]

$$\lambda d - \lambda h = L \cdot (\alpha d - \alpha h) \cdot (5 - 20) \quad (2)$$

$$= -0.018.$$

Meanwhile, [−] indicates that the lateral surface of the center opening 11 is in conflict with the shank 22.

[temperature change from +20° C. to +55° C.]

$$\lambda d - \lambda h = L \cdot (\alpha d - \alpha h) \cdot (55 - 20) \quad (3)$$

$$= +0.041.$$

Meanwhile, [+] indicates that the gap C1 has been produced.

The tolerance of the shank 22 at ambient temperature is (φ25−0.02/−0.045 mm, while the tolerance of the inside diameter of the magnetic disc 3 is (φ25+0.05/0.

Therefore, the gap C1 between the maximum size/minimum size at ambient temperature is such that the minimum size Min=+0.02 and the maximum size Max=+0.095.

Taking these tolerances into account, the minimum gap C1 in a temperature range of from +5° C. to +55° C. is such that $$\text{Min} = +0.2 - 0.018 = +0.002 \text{ mm (minimum gap C1 for } +5^\circ \text{ C.)}$$

$$\text{Max} = +0.095 + 0.041 = +0.136 \text{ mm (maximum gap C1 for } +55^\circ \text{ C.)}.$$

Therefore, in this specified example, it is possible to prevent the lateral surface of the center opening 11 from coming into contact with the outer lateral surface of the shank 22 by procuring the gap C1 at +5° C. of +0.002 mm.

Referring to FIGS. 10 to 12, the clamp mechanism 21 has a disc supporting portion 23 which is formed as-one with the shank 22 supporting the lowermost magnetic disc 3 by the rim of the center opening 11 and which constitutes a disc supporting member along with the shank 22. The disc supporting portion 23 is formed as a flange on the proximal end towards the spindle motor 4 of the shank 22, as shown in FIGS. 11 and 12. The inner periphery of the disc supporting portion 23 is formed with a cut-out 24 facing the thin-walled portion 12 and the clamp region 15 of the magnetic disc 3. That is, the cut-out 24 defines the gap C1 between the clamp region 15 and the surface of the cut-out 24 facing the clamp region 15, as shown in FIG. 12. The cut-out 24 operates, by this gap C1, for prohibiting the projections 18a, 18b formed on the inner rim end of the disc substrate when the disc substrate is cooled during molding thereof from coming into contact with the disc supporting portion 23.

On the outer rim side of the cut-out 24 of the disc supporting portion 23 is formed with a supporting portion 25 adapted to support the magnetic disc 3 by the clamp area 15 of the magnetic disc 3. That is, the magnetic disc 3 is supported by the supporting portion 25 at a position spaced a pre-set distance from the inner rim end of the main body portion of the disc substrate 13, that is by the clamp region 15 in which the projection 18 formed on the inner rim end of the main body portion of the disc substrate 13 ceases to exist and in which the main body portion of the disc substrate 13 presents a planar surface. This supports the lowermost magnetic disc 3 in a parallel state with respect to the base member 2. Specifically, a gap C2 between the surface of the cut-out 24 facing the clamp region 15 and the clamp region 15 is not less than 0.02 mm, whilst a spacing 11 between the inner rim of the main body portion of the disc substrate 13 and the supporting position of the magnetic disc 3 by the supporting portion 25 is not less than 0.1 mm, as shown in FIG. 12.

The clamp mechanism 21 includes a spacer 26 for supporting the magnetic discs 3 at a pre-set distance from each other, as shown in FIGS. 10 to 12. The spacer 26 is ring-shaped and has its inside diameter approximately equal to the outside diameter of the shank 22 and is fitted to the shank 22. The spacer 26 is of such a thickness that a gap which barely permits entrance of the magnetic head device 5 therein is defined between it and the magnetic disc 3. The spacer 26 is formed on the inner rim ends of both sides thereof with a cut-out 27 facing the thin-walled portions 12 and the clamp regions 15 of the magnetic discs 3. That is, similarly to the cut-out 24, the cut-out 27 defines the gap C2 between the clamp region 15 and the surface of the cut-out 27 facing the clamp region 15. By the gap C2, the cut-out 27 serves to prevent the projections 18a, 18b produced on the inner rim end of the disc substrate from contacting with the disc supporting portion 23 when the disc substrate is cooled during molding the disc substrate.

On the outer rim side of the cut-out 27 on the upper surface of the spacer 26 is formed a supporting portion 28 for supporting the magnetic disc 3 by its clamp region 15. On the outer rim of the cut-out 27 in the lower surface of the spacer 26 is formed a second supporting portion 29 adapted for clamping the clamp region 15 of the magnetic disc 3 along with the first support portion 28. The first and second supporting portions 28, 29 are formed for clamping the clamp region 15 at a pre-set distance from the inner rim of the main body portion of the disc substrate 13, that is at a position where the projections 18a, 18b formed on the inner rim of the main body portion of the disc substrate 13 cease to exist and where the surface of the main body portion of the disc substrate 13 becomes planar. Meanwhile, the magnetic disc 3 between the uppermost magnetic disc 3 and the lowermost magnetic disc 3 is supported by its clamp region 15 being clamped by the first and second supporting portions 28, 29 of the spacer 26.

With the spacer 26, the gap C2 between the surface of the cut-out 27 facing the clamp region 15 and the clamp region 15 is not less than 0.02 mm, with the distance 11 from the inner rim of the main body portion of the disc substrate 13 to the supporting position of the magnetic disc 3 being not less than 0.1 mm. The surfaces of the first and second supporting portions 28, 29 contacted with the clamp region 15 are polished to a smooth surface so that the disc substrate 10 will be slid smoothly when the disc substrate 10 is expanded or contracted with changes in temperature. For example, the supporting portions 28, 29 are designed to have a surface roughness of not larger than 0.4 μm in terms of Rmax or not larger than 4 μm in terms of the maximum height value. The disc substrate 10 may also be coated with a lubricating coating material so that the disc substrate 10 will be slid smoothly with respect to the first and second supporting portions 28, 29. The coating materials may, for example, be fluorine or Teflon superior in lubricating properties or in resistance against abrasion.

Figure 13:
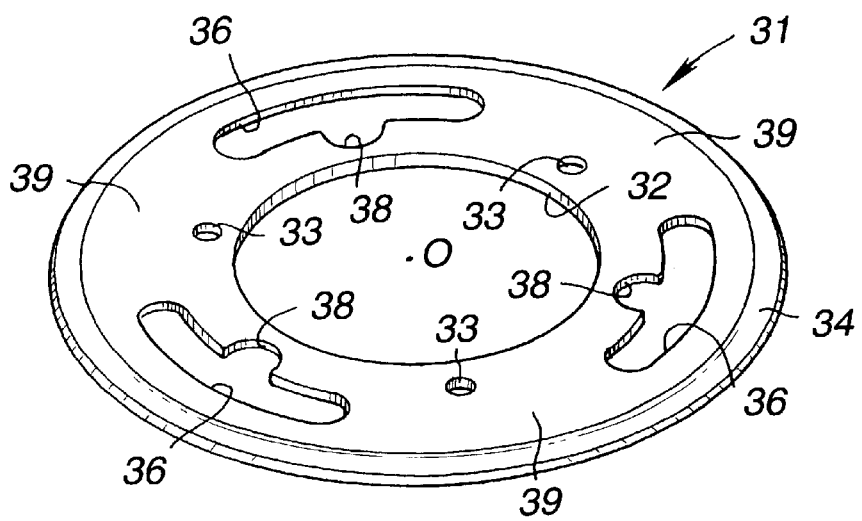
FIG. 13 is a perspective view showing a thrusting supporting member.

The clamp mechanism 21 is also provided with a thrusting supporting member 31 for thrusting the uppermost magnetic disc 3 towards the disc supporting portion 23 as shown in FIGS. 10, 11 and 13. The thrusting supporting member 31 is formed by punching a plate-shape member, such as a metal plate, into a ring shape, as shown in FIG. 13. The thrusting supporting member 31 is able to close the center opening 11 of the magnetic disc 3 and is dimensioned to thrust the clamp region 15 in an outer rim portion. This thrusting supporting member 31 has a positioning center opening 32 and plural equiangularly spaced positioning holes 33 along the circumferential direction. The thrusting supporting member 31 is arranged on the end face of the shank 22 by having the opening 32 engaged by a positioning projection 22a provided on the end face of the shank 22 and by having a positioning lug, not shown, provided on the end face of the shank 22, engaged in the positioning holes 33.

The thrusting supporting member 31 is formed by a plate spring member, adapted for being elastically flexed in a direction perpendicular to the radial direction, and is formed with a thrusting portion 34 on its outer rim side facing the magnetic disc 3 for thrusting the magnetic disc 3. The thrusting portion 34 is expanded from the side of the thrusting supporting member 31 facing the magnetic disc 3 to a substantially arcuate cross-section. When the thrusting portion 34 is mounted on the shank 22, it is mounted facing a supporting portion 28b of the spacer 26. Thus, the thrusting portion 34 has a point contact with the clamp region 15 of the magnetic disc 3 so that the magnetic disc 3 is liable to slip in the radial direction to prevent the dragging with respect to the magnetic disc 3 caused by the shifting of the contact point with the clamp region 15 to maintain optimum surface properties of the magnetic disc 3.

When the thrusting portion 34 is mounted by a set screw 35 on the shank 22, the thrusting portion 34 constitutes a plurality of load concentrating sections 40 thrusting the magnetic disc 3 towards the spacer 26 and the disc supporting portion 23 by the clamp region 15 of the magnetic disc 3. The load concentrating sections 40 will be discussed later in detail.

The thrusting portion 34 has its contact surface with the clamp region 15 as a smooth surface, and has its surface contacting with the clamp region 15 having a value of surface roughness Rmax not larger than 0.4 μm, as shown in FIG. 1. In this manner, when the thrusting supporting member 31 is mounted on the shank 22, the thrusting portion 34 permits the magnetic disc 3 to slip in the radial direction to prevent the dragging relative to the magnetic disc 3 caused by the shifting of the contact portion thereof with the clamp region 15. The magnetic disc 3, having its substrate 10 formed of synthetic resin, undergoes radial expansion and contraction with changes in diameter. During this expansion and contraction, the thrusting portion 34 is liable to slip relative to the clamp region 15 to prevent the magnetic disc 3 from being worsened in planarity ask a result of the shifting of the contact point thereof with the clamp region 15.

Meanwhile, the thrusting portion 34 may be formed to have a value of surface roughness Rmax (maximum value of the differences of the micro-sized crests and recesses) not larger than 4 μm to permit the thrusting portion 34 to slip more readily with respect to the clamp region 15. The contact surface of the thrusting portion 34 may be coated with a coating material having high lubricating and abrasion-resistant properties, such as fluorine or Teflon, to increase its slipping with respect to the clamp region 15.

The thrusting supporting member 31 is formed with through-holes 36 for forming the load concentrating sections 40 for thrusting the magnetic disc 3 in its thrusting portion 34, as shown in FIG. 13. These through-holes 36 are provided as equiangular openings extending in the circumferential direction of the thrusting supporting member 31 at a pre-set distance from the center O of the thrusting supporting member 31, as shown in FIG. 13. Specifically, the through-holes 36 are formed as substantially arcuate elongate holes. The through-hole 36 is formed so that an angle a which both ends of the through-hole 36 includes with the center O of the thrusting supporting member 31 will be 360/2N°, where N is the number of the set screws 25. That is, the through-hole 36 shown in FIG. 13 is formed so that the above angle α will be 60°, with the number of the through-holes 35 being three. This produces the load concentrating sections 40 at equal intervals on the thrusting portion 34.

The through-hole 36 is formed with a pressuring portion 38, for pressuring the end face of the shank 22 by the set screw 35, as shown in FIG. 13. The pressuring portion 38 is formed as an inwardly directed cut-out recess at the center of the inner rim of the through-hole 36. The set screw 35 for securing the thrusting supporting member 31 to the shank 22 is inserted into this cut-out recess. The pressuring portion 38 is thrust by a head 35a of the set screw 35 into pressure contact with the end face of the shank 22. In the end face of the shank 22 is formed a tapped hole 37 in register with the pressuring portion 38, as shown in FIG. 11. The thrusting supporting member 31 is secured to the shank 22 by having the set screw 35 inserted through the pressuring portion 38 and threaded into the tapped hole 37. Since the pressuring portion 38 is provided on the inner rim side of the through-hole 36, the head 35a of the set screw 35 is not abutted against the outer peripheral side rim. It is noted that the set screw 35 is clamped in the tapped hole 37 to apply a uniform load against the pressuring portion 38.

Figure 15:
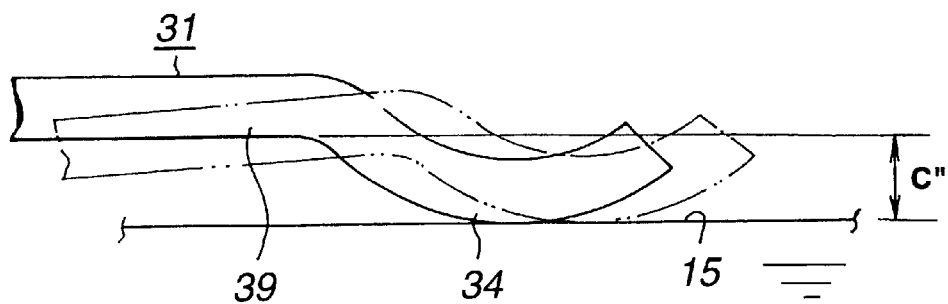
FIG. 15 illustrates the state in which the thrusting supporting member is elastically deformed.
Figure 16:
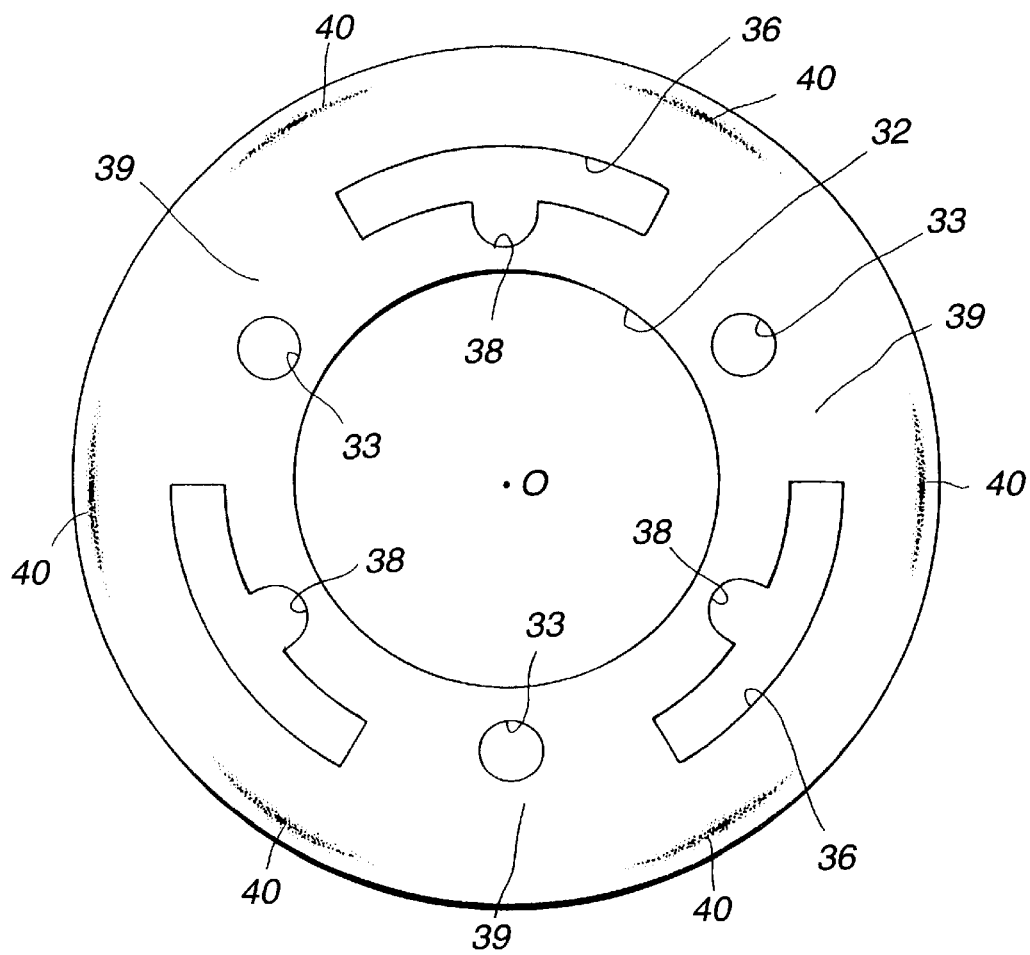
FIG. 16 is a plan view of the thrusting supporting member.

The thrusting supporting member 31 is formed with load transmitting sections 39 between the through-holes 36 for transmitting the load on the pressuring portions 38 to the thrusting portions 34, as shown in FIG. 13. The load transmitting sections 39 are elastically displaced by being warped towards the magnetic disc 3, about the thrusting portion 34 as the center, by the load transmitting sections 39 being thrust by the head 35a of the set screw 35, for transmitting the load on the pressuring portions 38 to the thrusting portion 34. At this time, the thrusting portion 34 is moved from the inner rim side to the outer rim side of the thrusting supporting member 31, by the load transmitting section 39 being elastically displaced towards the magnetic disc 3, as shown in FIG. 15. The load concentrating sections 40, for concentrating the load applied to the magnetic disc 3, are formed in the vicinity of both ends of the through-hole 36 in the thrusting portion 34, as shown in FIG. 16. The load concentrating sections 40 are formed in the vicinity of both ends of the through-holes 36 with equal loads and at equal intervals on the circumference of the thrusting portion 34. That is, there are provided a number of the load concentrating sections 40 larger than, herein twice as many as, the number of the set screws 35 adapted for securing the thrusting supporting member 31 to the shank 22. Since the load is distributed, the load in a given load concentrating section 40 is decreased. Since the through-holes 36 are provided radially outwardly of the pressuring portions 38 and the lengths of the pressuring portion 38 and the thrusting portion 34 are increased, it is possible to reduce the load in the load concentrating sections 40. In FIG. 16, the more pronouncedly the load concentrating sections 40 are shaded, the larger becomes the load applied in the load concentrating sections 40.

In the above-described clamp mechanism 21, the center opening 11 of the lowermost magnetic disc 3 is passed through by the shank 22 to have the magnetic disc supported by the disc supporting portion 23, as shown in FIGS. 11 and 12. The spacer 26 then is fitted on the shank 22. The center opening 11 of the next magnetic disc 3 is passed through by the shank 22, at a position above the spacer 26, in order to have the magnetic disc 3 supported in position. That is, the lowermost magnetic disc 3 is supported by having the lower surface of the clamp region 15 supported by the supporting portion 25 of the disc supporting portion 23 and by having the upper surface o the clamp region 15 supported by the supporting portion 29 of the spacer 26, with the clamp region 15 of the magnetic disc 3 thus being clamped by the supporting portion 25 and the supporting portion 29. The magnetic disc 3, arranged between the uppermost magnetic disc and the lowermost magnetic disc 3, is supported by being clamped by the supporting portion 25 and the supporting portion 29 of the spacers 26 lying directly above and below the magnetic disc 3. The uppermost magnetic disc 3 is supported by having the lower surface of the clamp region 15 supported by a supporting portion 28 of the spacer 26, with the uppermost magnetic disc 3 then being clamped by the thrusting portion 34 of the thrusting supporting member 31 and by the supporting portion 28.

These magnetic discs 3 are supported by the thrusting supporting member 31 being clamped by the set screws 35 against the shank 22. That is, plural magnetic discs 3 are supported by the clamp mechanism 21 by the thrusting supporting member 31 being mounted on the shank 22 and by the thrusting portion 34 being thrust in the direction of the spacer 26 and the disc supporting portion 23.

Specifically, the thrusting supporting member 31 is mounted on the end face of the shank 22 by the set screws 35 traversing the pressuring portions 38 into threaded engagement with the tapped hole 37, as shown in FIG. 11. At this time, the heads 35a of the set screws 35 thrust the end faces of the shanks 22 with an even load, as shown in FIG. 11. The load transmitting sections 39 of FIG. 13 then cause the thrusting portions 34 to be thrust by the heads 35a of the set screws 35 and to be thereby elastically flexed towards the magnetic disc 3, about the thrusting portion 34 as center, to transmit the load applied to the pressuring portions 38 to the thrusting portion 34. At this time, the thrusting portion 34 is moved from the inner rim side towards the outer rim side of the thrusting supporting member 31, as a result of the elastic flexure of the load transmitting sections 39. In the thrusting portion 34, there are evenly produced load concentrating sections 40 in the vicinity of both ends of the through-holes 36.

In the load concentrating sections 40, since the through-hole 36 is provided on the outer rim side of the pressuring portion 38, and the lengths of the pressuring portion 38 and the thrusting portion 34 are increased, it is possible to diminish the load in the load concentrating sections 40. Also, the sum total of six load concentrating sections 40 are provided, that is at a rate of two to each pressuring portion 38, thus distributing the load. The magnetic-disc 3 is thrust by the thrusting portion 34 to eliminate the risk of local deformation.

The thrusting supporting member 31 thrusts the magnetic disc 3 in a direction parallel to the axis of the driving shaft 4a. Specifically, the total pressure by which the thrusting supporting member 31 thrusts the magnetic disc 3 is set in accordance with the following relationship:

$$W \times G \leq F < W \times G/2 \mu$$

where F is the total thrusting pressure, W the total weight of the magnetic disc 3 and the spacer 26, G the acceleration on shock application during non-operation of the disc drive device 1, and $\mu$ the frictional coefficient between the magnetic disc 3 and the thrusting supporting member 31, with the frictional coefficient on the upper and lower surfaces of the magnetic disc 2 being 2 $\mu$. That is, the total thrusting pressure F is set so as to be not less than the impact value along the axial direction during the nonoperating time. $W \times G/2 \mu$ denotes the offset along the radius of the magnetic disc 3. Thus, the total thrusting pressure F is set so as to be less than the force necessary for radial offset. Thus, it is possible for the clamp mechanism 21 to cause the magnetic disc 3 to slide smoothly to prevent worsening of the planarity as a result of disc dragging even if the magnetic disc 3 is expanded or contracted by e.g., temperature changes. The clamp mechanism 21 allows for offset of the magnetic disc 3 in the radial direction and prohibits the eccentricity of the magnetic disc 3 by an eccentricity preventative member 72 as later explained.

Figure 17:
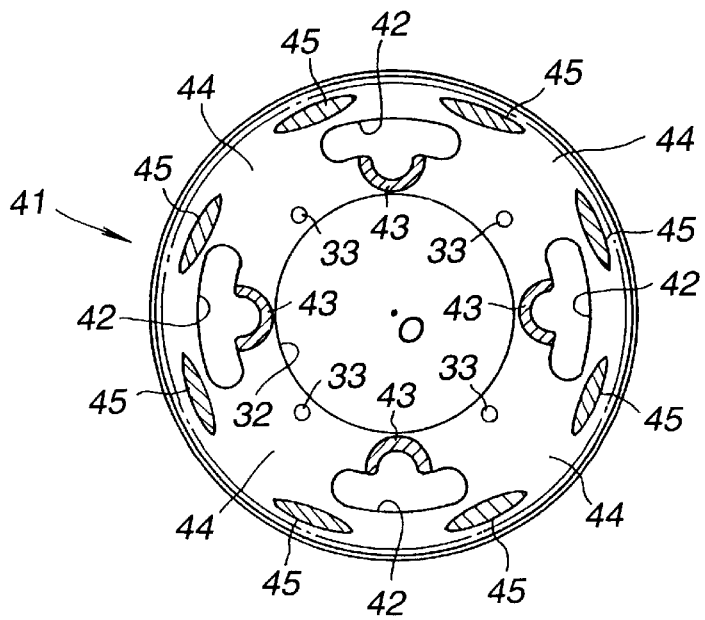
FIG. 17 is a plan view showing another thrusting supporting member.

The following configuration may also be used for the above-described thrusting supporting member 31. Meanwhile, parts or components which are the same as the above-described thrusting supporting member 31 are denoted by the same reference numerals and are not explained specifically. Referring to FIG. 17, there is shown a thrusting supporting member 41 having a positioning center opening 32 and a plurality of equiangularly spaced apart positioning openings 33 in the circumferential direction. On the outer peripheral side of the thrusting supporting member 41, there is provided a thrusting portion 34 facing the magnetic disc 3 for thrusting the magnetic disc 3.

Figure 14:
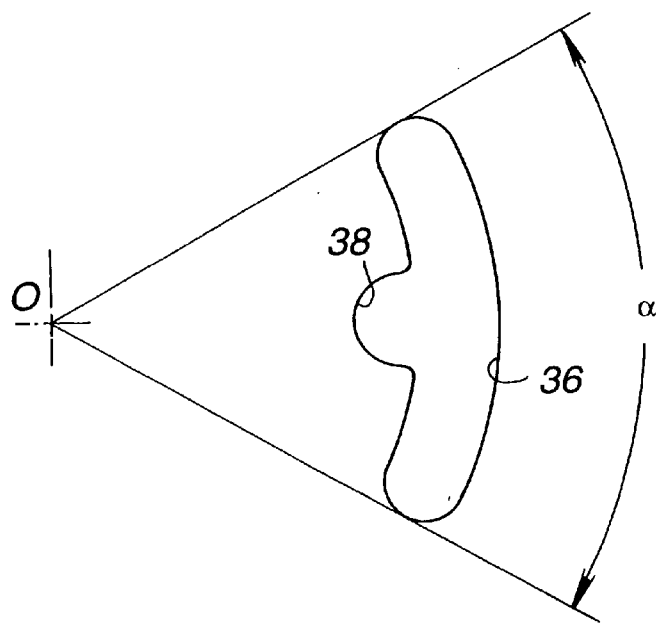
FIG. 14 illustrates an insertion opening for the thrusting supporting member.

The thrusting supporting member 41 is formed with through-holes 42 for providing load concentrating sections 45 for thrusting the magnetic disc 3. A plurality of such through-holes 42 are provided at equiangular intervals at a pre-set distance from the center O of the thrusting supporting member 41. A sum total of four through-holes 42 are formed to a substantially arcuate elongate shape, with an angle a shown in FIG. 14 being approximately 45°.

Each through-hole 42 is formed with an inwardly protruded pressuring portion 43 brought into pressure contact with the end face of the shank 22 by the set screw 35. The pressuring portion 43 is formed by being cut out at a mid portion of the inner rim of the through-hole 42. It is in this cut-out pressuring portion 43 that the set screw 35 adapted to secure the thrusting supporting member 41 against the shank 22. The pressuring portion 43 is thrust by the head 35a of the set screw 35 into pressure contact with the end face of the shank 22. The thrusting supporting member 41 is secured to the shank 22 by the set screw 35 being passed through the pressuring portion 43 into threaded engagement with a tapped hole 37. The head 35a of the set screw 35 is not abutted against the outer side rim of the through-hole 42 because the pressuring portion 43 is provided on the inner rim of the through-hole 42.

Since the pressuring portion 43 has its pressuring portion 43 thrust by the head 35a of the set screw 35, a load transmitting portion 44 is elastically flexed towards the magnetic disc 3, about the thrusting portion 34 as center, to transmit the load in the pressuring portion 43 to the thrusting portion 34. At this time, the thrusting portion 34 has the load transmitting portion 44 elastically displaced towards the magnetic disc 3, and hence the thrusting portion 34 is moved from the inner rim towards the outer rim of the thrusting supporting member 41. In the vicinity of both ends of the through-hole 42 in the thrusting portion 34, there are formed load concentrating sections 45 where there is concentrated the load thrusting the magnetic disc 3.

These load concentrating sections 45 are equiangularly formed on the circumference of the thrusting portion 34. A sum total of eight load concentrating sections 45 are provided for equalizing the load in the vicinity of both ends of the through-hole 42. That is, the number of the load concentrating sections 45 is twice the number of the set screws 35 used for securing the thrusting supporting member 41 to the shank 22. The result is that the concentrated load is distributed to enable the load per one load concentrating section 45 to be reduced. It is thus possible with the thrusting portion 34 to reduce the value of load concentrated by the load concentrating sections 45 without changing the total thrusting pressure to prohibit the magnetic disc 3 from being locally deformed.

Figure 18:
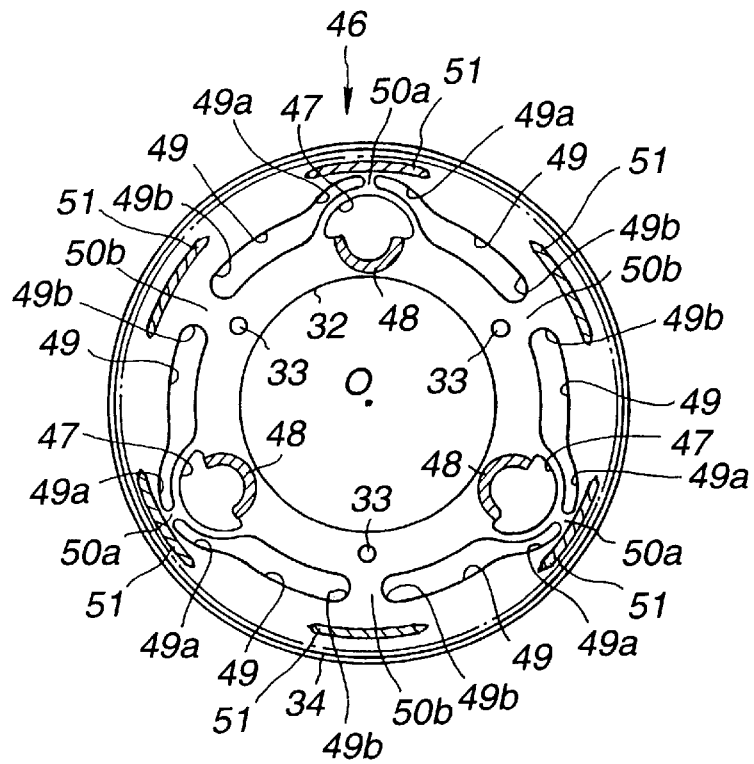
FIG. 18 is a plan view showing still another thrusting supporting member.

The following configuration of the thrusting supporting member 31 may also be used. Specifically, a thrusting supporting member 46 features providing a through-hole and a pressuring portion separately from each other. Meanwhile, parts or components similar to those of the thrusting supporting member 31 are depicted by the same reference numerals and are not specifically explained. This thrusting supporting member 46 has a positioning center opening 32 and plural positioning openings 33 along the circumferential direction, as shown in FIG. 18. On the outer rim side of the thrusting supporting member 41 is formed a thrusting portion 34 facing the magnetic disc for thrusting the disc.

The thrusting supporting member 46 is formed with a plurality of through-holes 47 in each of which is inserted a set screw 35 for securing the thrusting supporting member 46 against the end face of the shank 22. The through-holes 47 are formed equiangularly in the circumferential direction of the thrusting supporting member 41 at a pre-set distance from the center O of the thrusting supporting member 46. Each through-hole 47 has its outer rim side dimensioned to be larger than the head 35a of the set screw 35, while having its inner rim side formed with a pressuring section 48 which is pressured against the end face of the shank 22 by the set screw 35. The pressuring section 48 is formed by being inwardly cut out at a mid portion of the inner rim of the through-hole 47. It is in this cut-out pressuring section 48 that the set screw 35 for securing the thrusting supporting member 46 to the shank 22 is inserted. The pressuring section 48 is thrust by the head 35a of the set screw 35 into pressure contact with the end face of the shank 22. The thrusting supporting member 46 is secured to the shank 22 by the set screw 35 being inserted in the pressuring section 48 into threaded engagement with the tapped hole 37. Since the pressuring section 48 is provided on the inner rim side of the through-hole 47, the head 35a of the set screw 35 is not abutted against the outer rim side.

The thrusting supporting member 46 is formed with plural through-holes 49 for forming the load concentrating sections for thrusting the magnetic disc 3 against the thrusting portion 34 on the outer rim side of the through-hole 47 provided with the pressuring section 48.The thrusting supporting member 46 includes a through-hole 49 for thrusting the magnetic disc 3 against the thrusting portion 34 on the outer rim side of the through-hole 47 provided with the pressuring section 48. The through-holes 49 are equiangularly formed in the circumferential direction at a pre-set distance from the center O of the thrusting supporting member 46 on the outer rim side of the through-hole 47. The through-holes 49 are substantially arcuate elongate openings extending in either direction from the vicinity of the through-hole 47, with an end 49a near the through-hole 47 overlying the through-hole 47 and being narrower than the other end 49b. The through-holes 49 are paired through-holes extending to both sides from the through-hole 47, with these paired through-holes being formed equiangularly in the circumferential direction.

Between the neighboring through-holes 49, there are formed load transmitting sections 50a, 50b for transmitting the load of the pressuring section 48 to the thrusting portion 34. The load transmitting section 50a, formed by one end 49a of the through-hole 49, is of a finer width, whilst the load transmitting section 50b, formed by the other end 49b of the through-hole 49 lying on the opposite side of the end 47a, is of a broader width. This equalizes the concentrated load of a load concentrating section 51 formed by the load transmitting sections 50a, 50b.

By the pressuring section 48 being thrust by the head 35a of the set screw 35, the load transmitting sections 50a, 50b are elastically flexed towards the magnetic disc 3, about the thrusting portion 34 as center, to transmit the load in the pressuring section 48 to the thrusting portion 34. At this time, the load transmitting sections 50a, 50b are elastically flexed towards the magnetic disc 3, whereby the thrusting portion 34 is moved from the inner rim side towards the outer rim side of the thrusting supporting member 46. In the thrusting portion 34, plural load concentrating sections 51, in which are concentrated the loads thrusting the magnetic disc 3, are formed in the vicinity of both ends of the through-holes 49. Specifically, six load concentrating sections 51 are evenly formed on the circumferential portion of the thrusting portion 34 in the vicinity of both ends of the through-holes 49. That is, the number of the load concentrating sections is twice the number of the set screw 35 used for securing the thrusting supporting members 46 to the shank 22. Thus, the load may be distributed to reduce the load per load concentrating section 51. Also, the through-hole 49 is provided on the outer rim side of the pressuring section 48 such that the length of the pressuring section 48 and the thrusting portion 34 combined together is increased to enable the concentrated load on the respective load concentrating sections 51 to be reduced. Thus, the thrusting portion 3 prohibits local deformation of the magnetic disc 3 from being deformed along its thickness to prevent the magnetic disc from becoming deteriorated in planarity.

Figure 19:
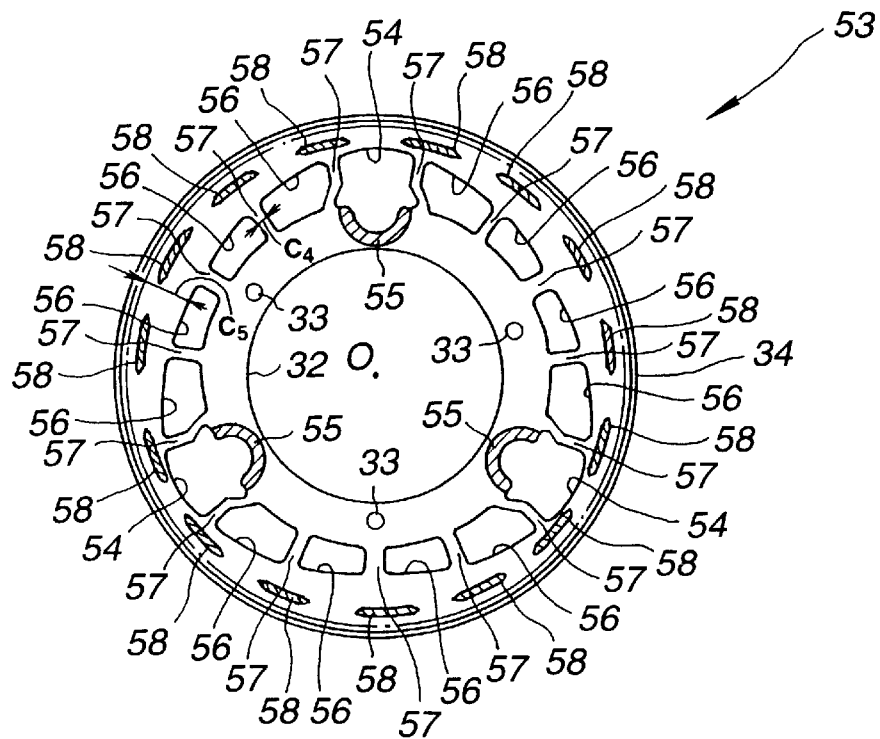
FIG. 19 is a plan view showing still another thrusting supporting member.

The following configuration may also be used for the thrusting supporting member 31. The portions or components which are the same as those of the abovedescribed thrusting supporting member 31 are depicted by the same reference numerals and are not explained in detail. The thrusting supporting member 53 has a positioning center opening 32 and plural equiangular positioning openings 33 in the circumferential direction, as shown in FIG. 19. On the outer rim side of the thrusting supporting member 53, there is provided a thrusting portion 34 facing the magnetic disc 3 for thrusting the disc.

The thrusting supporting member 53 is provided with a first through-hole 54 for forming a load concentrating section in the thrusting portion 34 for thrusting the magnetic disc 3. A sum total of three first through-holes 54 are provided in the circumferential direction of the thrusting supporting member 53 at a pre-set distance from the center O of the thrusting supporting member 31.

The first through-hole 54 has its outer peripheral side larger in size than the head 35a of the set screw 35, while having its inner rim formed with a protuberant pressuring section 55 adapted for compressing against the end face of the shank 22. The pressuring section 55 is formed at a mid portion of the inner rim of the first through-hole 54 by being inwardly cut out. It is in this pressuring section 55 that the set screw 35 for fastening the thrusting supporting member 53 to the shank 22 is secured. The pressuring section 55 is thrust by the head 35a of the set screw 35 into pressure contact with the end face of the shank 22. The thrusting supporting member 53 is secured to the shank 22 by having the set screw 35 inserted through the pressuring section 55 into threaded engagement with the tapped hole 37. Since the pressuring section 55 is formed in the inner rim side of the fist through-hole 54, the head 35a of the set screw 35 is not abutted against the outer rim of the first through-hole 54.

Between the first through-holes 54, there are formed second through-holes 56 for forming load concentrating sections in the thrusting portion 34 for thrusting the magnetic disc 3. In FIG. 19, there are four second through-holes 56 between the first through-holes 54. The thrusting supporting member 53 is provided with load concentrating sections 57 for transmitting the load in the pressuring section 55 to the thrusting portion 34 between the first through-hole 54 and the second through-holes 56 and between the second through-holes 56. It is noted that the load concentrating sections 57 lying closer to the mid point between the first through-holes 54 are spaced apart from each other by a larger gap C4, and that the distance C5 between the outer periphery of the thrusting supporting member 53 and the outer periphery of the first and second through-holes 56 becomes larger towards the mid point between the neighboring through-holes 57. By the pressuring section 55 being thrust by the head 35a of the set screw 35, the load concentrating sections 57 are elastically flexed towards the magnetic disc 3, about the thrusting portion 34 as center, to transmit the load at the pressuring section 55 to the thrusting portion 34. At this time, the thrusting portion 34 is moved from the inner rim towards the outer rim of the thrusting supporting member 31 by the load concentrating sections 57 becoming elastically flexed towards the magnetic disc 3. In the vicinity of both ends of the first through-hole 54 and the second through-hole 56 in the thrusting portion 34, there is produced a load concentrating section 58 where there is concentrated the load thrusting the magnetic disc 3.

15 such load concentrating sections 58 are evenly formed in the vicinity of both ends of the first through-hole 54 and the second through-hole 56. Since the number of the load concentrating sections 58 is thrice that of the load concentrating sections 55, the load is distributed at an even interval on the circumference of the thrusting portion 34 to reduce the load on the load concentrating sections 58. Since the first through-hole 54 and the second through-hole 56 are provided on the outer rim of the pressuring section 55, so that the lengths of the pressuring section 55 and the thrusting portion 34 are increased. Therefore, the load in the load concentrating sections 58 is reduced. Thus, with the thrusting portion 34, since the interval between neighboring load concentrated portions can be decreased without changing the total thrusting force on the magnetic disc 3, it is possible to prevent the magnetic disc from undergoing local deformation along the direction of thickness of the magnetic disc 3. The result is that the magnetic disc is prevented from being deteriorated in planarity.

As modifications of the thrusting supporting member 31, the thrusting supporting members 41, 46 and 53 have been explained in the foregoing. The present invention is, however, not limited to these configurations. For example, although the pressuring portions 38, 43, 48 and 55 are formed in the above-described embodiment equiangularly in the circumferential direction, it is only sufficient if the pressuring portions 38, 43, 48 and 55 are formed at least in a distributed fashion in the circumferential direction. It is also only sufficient if the through-holes are formed at least in a distributed fashion in the circumferential direction. If the through-holes or the pressuring portions are not formed equiangularly, it is sufficient if the profile of the load transmitting sections is suitably changed to provide the evenly distributed and equiangularly spaced loads of the load concentrating sections.

A magnetic head device 5 for recording and/or reproducing information signals for the magnetic disc 3 carrying the. clamp mechanism 21 includes a rotary arm 63 supporting a head slider 5c carrying a magnetic head element 5b at its distal end and a voice coil motor 64 for rotationally operating the rotary arm 63, as shown in FIG. 1.

The rotary arm 63 has its mid portion supported by a pivot shaft 65 set upright on the base member 2, and is rotated in the direction indicated by arrow R2 in FIG. 1 about the pivot shaft 65 as the center of rotation. The head slider 5c is mounted on the rotary arm 63 via a head supporting arm 5a, such as a plate spring, connected to the distal end of the rotary arm 63, as shown in FIG. 2. This head supporting arm 5a is formed so as to be elastically displaced in a direction towards and away from the signal recording region 14 of the magnetic disc 3.

The voice coil motor 64 includes a driving coil 66 mounted on the proximal end of the rotary arm 63, and a magnet 67 mounted facing the driving coil 66 on the base member 2. The voice coil motor 64 causes rotation of the rotary arm 63 in the direction indicated by arrow R2 in FIG. 1, about the pivot shaft 65 as the center, under the action of the driving current supplied to the driving coil 66 and the magnetic field of the magnet 67.

As the rotary arm 63 is run in rotation, the head slider 5c, mounted on the distal end of the rotary arm 63, is moved across the inner and outer rims of the magnetic disc 3. The magnetic head element 5b, mounted on the head slider 5c, scans the signal recording region 14 of the magnetic disc 3 to record and/or reproduce information signals. If the magnetic head device 5 faces the surface of the rotating magnetic disc 3 carrying the signal recording region 14, the head slider 5c is floated from the magnetic disc 3, as shown in FIG. 2, by the action of the air current E generated between the magnetic disc 3 and the head slider 5c. By the floating of the head slider 5c, the magnetic head element 5b scans the signal recording region as the head element 5b is floated a pre-set distance D1 from the surface of the magnetic disc 3 carrying the signal recording region 14 to an area out of contact with the magnetic disc 3.

By the driving of the spindle motor 4, the spindle motor 4 is heated in the disc drive device 1, so that the temperature around the magnetic disc 3 is raised. If the spindle motor 4 is halted, the temperature around the magnetic disc 3 is lowered. If the temperature around the magnetic disc 3 is changed, the magnetic disc 3, formed of a synthetic resin material, undergoes radial expansion and contraction. Since the gap C1 is formed between the outer periphery of the shank 22 of the clamp mechanism 21 and the center opening 11 of the magnetic disc 3, the outer periphery of the shank 22 is prohibited from coming into contact with the lateral side of the center opening 11 even if the center opening 11 is reduced in diameter.

Also, since the gap C2 is formed clamp region 15 and the surface of the cut-out 24 facing the clamp region 15, the disc supporting portion 23 or the spacer 26 can be prohibited from coming into conflict with the projections 18a, 18b. On the other hand, since the magnetic disc 3 is supported via the pre-set distance 11, the projection 18 is prohibited from coming into conflict with the supporting portions 25, 28, 29.

Also, the thrusting supporting member 31 thrusts the magnetic disc along the axis of the driving shaft 4a with a thrusting force set to a smaller value than the force of axial offset of the magnetic disc 3. The thrusting portion 34 of the thrusting supporting member 31 is of a substantially arcuate cross-section and has a substantially arcuate cross-section. The load concentrating sections 40, formed in the thrusting portion 34 of the thrusting supporting member 31, are lower in the load magnitude, so that, if the magnetic disc 3 is contracted in size due to changes in temperature, it can be contracted smoothly to prevent the magnetic disc from being deformed along its thickness. The deviation of the magnetic disc surface from true planarity can be prohibited even if the magnetic disc is rotated in the direction indicated by arrow R1 in FIG. 1.

In the foregoing description, plural magnetic discs are used. However, the present invention may also be applied to using a sole magnetic disc 3. In such case, it is sufficient if the clamp mechanism 21 of the magnetic disc 3 is designed to clamp the magnetic disc 3 by the disc supporting portion 23 and the thrusting supporting member 31 provided on the shank run in rotation by the driving shaft 4a of the spindle motor 4.

Figure 20:
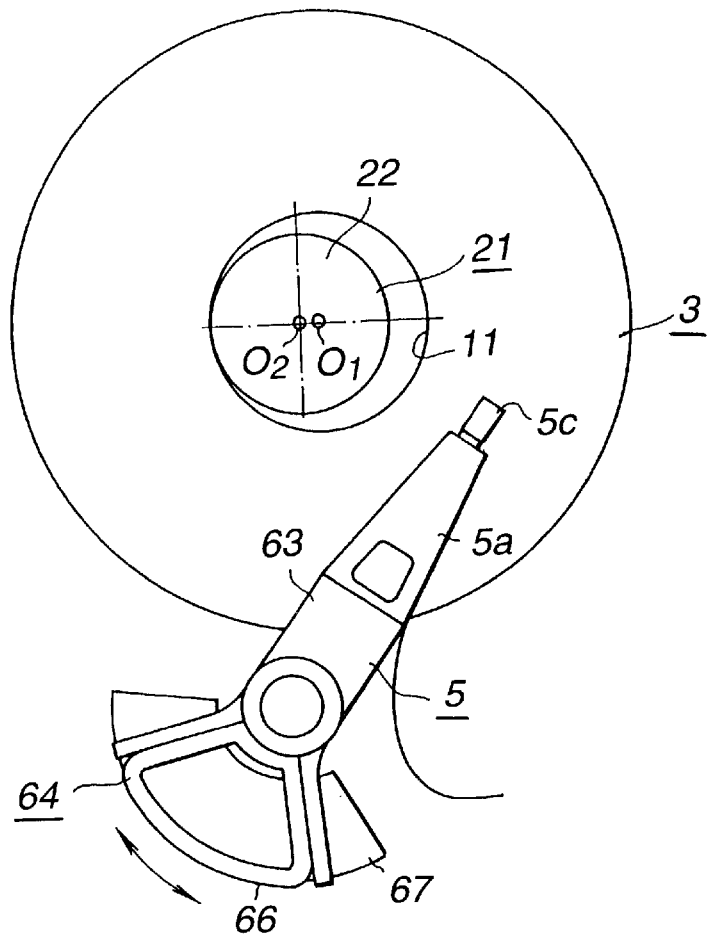
FIG. 20 is a plan view for illustrating an offset state of the thrusting supporting member.
Figure 21:
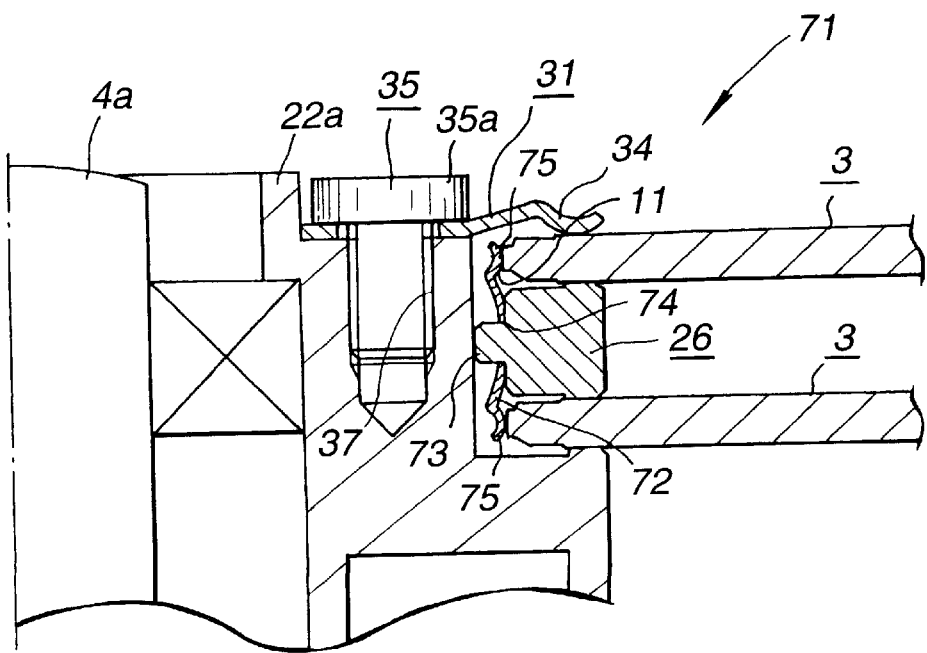
FIG. 21 is a cross-sectional view of a magnetic disc device carrying an eccentricity preventative member.

The following configuration may also be used for the disc drive device 1. The magnetic disc 3 is contracted and expanded by changes in environmental temperature, as shown in FIG. 20. The result is that the magnetic disc 3 becomes offset due to the center of rotation O1 of the magnetic disc becoming offset from the center of rotation O2 of the shank 22. With this in view, a disc drive device 71 features an eccentricity preventative member 72 provided on the clamp mechanism 21 for preventing the offsetting of the magnetic disc 3, as shown in FIG. 21. Meanwhile, parts or components similar to those of the disc drive device 1 are depicted by the same reference numerals and are not specifically explained.

The eccentricity preventative member 72 is formed by punching a spring member, such as a metal plate, and is mounted on the inner peripheral surface of the spacer 26, which spacer 26 has a fitting projection 73 on its inner peripheral surface for fitting on the shank 22, as shown in FIG. 21. The eccentricity preventative member 72 is formed by punching an elastically flexible spring member, such as a metal plate member. The eccentricity preventative member 72 is formed with a center mounting hole 74 by which the eccentricity preventative member 72 is to be mounted on the fitting projection 73. The eccentricity preventative member 72 is fixedly mounted on the inner peripheral surface of the spacer 26 by e.g., an adhesive.

The eccentricity preventative member 72 is also provided with a thrusting portion 75 for thrusting the lateral surface of the center opening 11 of the magnetic disc 3 towards the outer peripheral surface of the magnetic disc 3. The thrusting portion 75 is provided on each end of the eccentricity preventative member 72 for simultaneously thrusting two vertically neighboring magnetic discs 3. The thrusting portion 75 thrusts the lateral side of the center opening 11 of the magnetic disc 3 towards the outer peripheral surface of the magnetic disc 3.

A plurality of such eccentricity preventative members 72 are provided at such positions as to evenly thrust the center opening 11 of the magnetic disc 3 towards the outer periphery of the disc. For example, four eccentricity preventative members 72 are provided on mutually perpendicular centerlines of the shank 22 in the diametrically opposite relation to each other.

With the above-described disc drive device 71, in which the eccentricity preventative member 72 evenly thrusts the sidewall sections of the magnetic disc 3 towards the outer periphery of the disc, it is possible by mechanical means to prevent the offsetting of the magnetic disc 3 mounted on the clamp mechanism 21.

Figure 22:
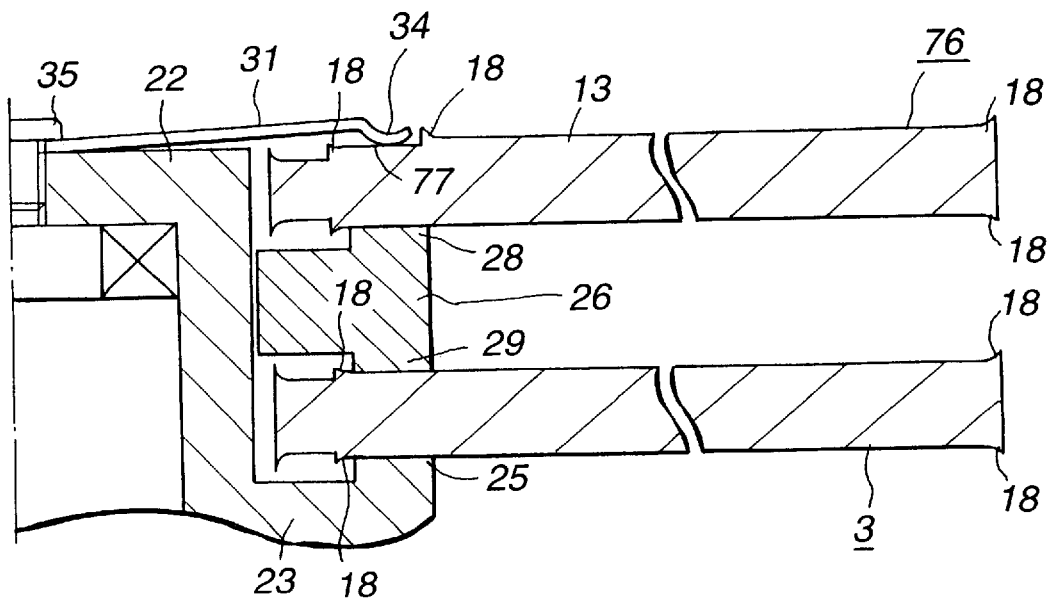
FIG. 22 is a cross-sectional view for illustrating a magnetic disc the upper and lower surfaces of which have been formed non-symmetrically.

The uppermost magnetic disc of the disc drive device 1 may also be configured as shown in FIG. 22. That is, the magnetic disc 76 features forming its upper and lower surfaces non-symmetrically. With the present magnetic disc 76, a clamp portion 77 on the upper surface of the magnetic disc is at a lower level than the level of the signal recording region 14 of the main body portion of the disc substrate 13. On this clamp portion 77 compresses the thrusting portion 34 of the thrusting supporting member 31 thrusting the magnetic disc 3. If plural magnetic discs are used, the magnetic disc 36 can be used as the uppermost magnetic disc, or may be used as a disc of a disc drive device employing a sole disc, with the magnetic disc used then being the sole magnetic disc.

Figure 23:
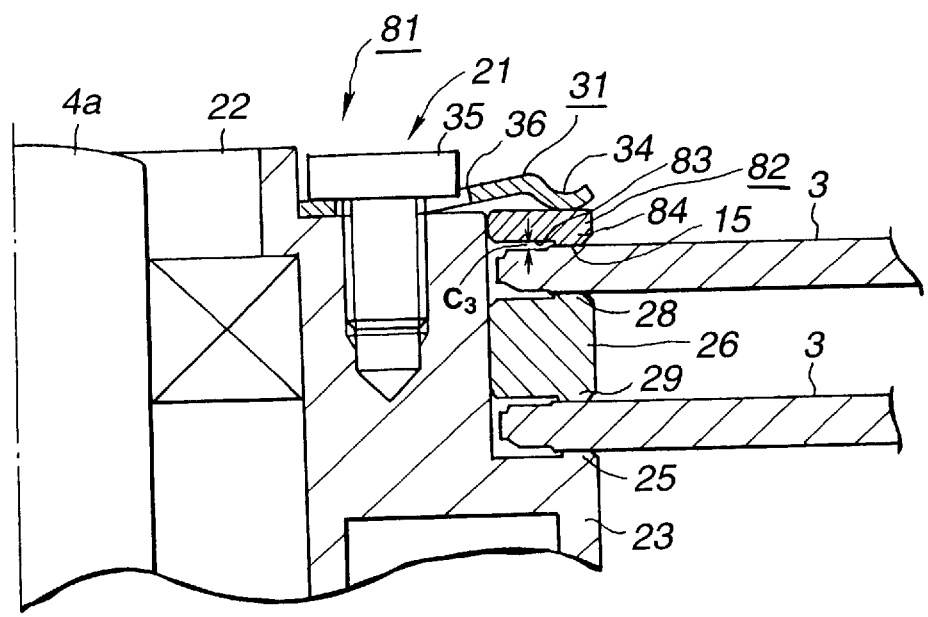
FIG. 23 is a cross-sectional view showing a magnetic disc device provided with a load concentrating releasing member for moderating the load concentration on the magnetic disc.

The above-described disc drive device 1 may also be constructed as shown in FIG. 23. With the disc drive device 81, a concentrated load releasing member 82 is interposed between the uppermost magnetic disc 3 and the thrusting supporting member 31 for releasing the concentrated load acting on the magnetic disc 3.

This concentrated load releasing member 82 is formed as a ring having substantially the same inside diameter as the outside diameter of the shank 22, and is fitted on the shank 22, as shown in FIG. 23. Also, the inner rim of the surface of the concentrated load releasing member 82 facing the uppermost magnetic disc 3 is formed with a cut-out 83. This cut-out 83 forms a gap C3 between the clamp region 15 and the surface of the cut-out 83 facing the clamp region 15. By this gap C3, the cut-out 83 prevents the projections 18a, 18b, produced on the inner rim of the disc substrate when cooling the disc substrate during molding of the disc substrate, from contacting with the concentrated load releasing member 82. Meanwhile, this gap C3 is not less than e.g., 0.02 mm. Also, the concentrated load releasing member 82 is provided on the outer rim side of the cut-out 83 with an abutment 84 compressing against the clamp region 15 of the magnetic disc 3. The contact surface of the abutment 84 is formed to a smooth surface to e.g., Rmax of not larger than 0.4 $\mu$m. By so doing, the abutment 84 renders the clamp region 15 lubricious when the magnetic disc 3 undergoes contraction or elongation in the radial direction due to changes in temperature to prevent the magnetic disc 3 from being deteriorated in planarity due to dragging caused by the shifting of the abutting site with the clamp region 15. On the other hand, the magnetic disc 3 is formed of a synthetic resin material, such that the magnetic disc undergoes expansion or contraction with changes in temperature. On the occasion of the expansion or contraction, the magnetic disc 3 can be slid smoothly by the abutment 83 to prevent the magnetic disc 3 from becoming deteriorated in surface properties due to dragging.

The surface roughness of the abutment 84, that is microsized crests and recesses, may be designed so that the maximum value of the level difference between the crests and recesses will be 4 $\mu$m or less to improve lubricity with respect to the clamp region 15. The contact surface of the abutment 84 may be coated with a coating material having superior lubricating and abrasion-resistance characteristics, such as fluorine or Teflon, to improve slipperiness with respect to the clamp region 15.

If the thrusting supporting member 31 is mounted in position as the concentrated load releasing member 82, releasing this load concentration, is interposed between the thrusting supporting member 31 and the magnetic disc 3, the load concentrating sections 40 are formed in the thrusting supporting member 31, however, the concentrated load releasing member 82 distributes the thrusting force in the load concentrating sections 40. Therefore, the concentrated load releasing member 82 reduce the value of the concentrated load on the magnetic disc 3 to reduce the local deformation along the thickness of the magnetic disc 3. Since the contact surface of the abutment 84 contacted with the concentrated load releasing member 82 is formed as a smooth surface, the magnetic disc 3 may be prevented from being deteriorated in planarity due to dragging even if the magnetic disc 3 undergoes contraction and expansion due to changes in temperature.

Figure 24:
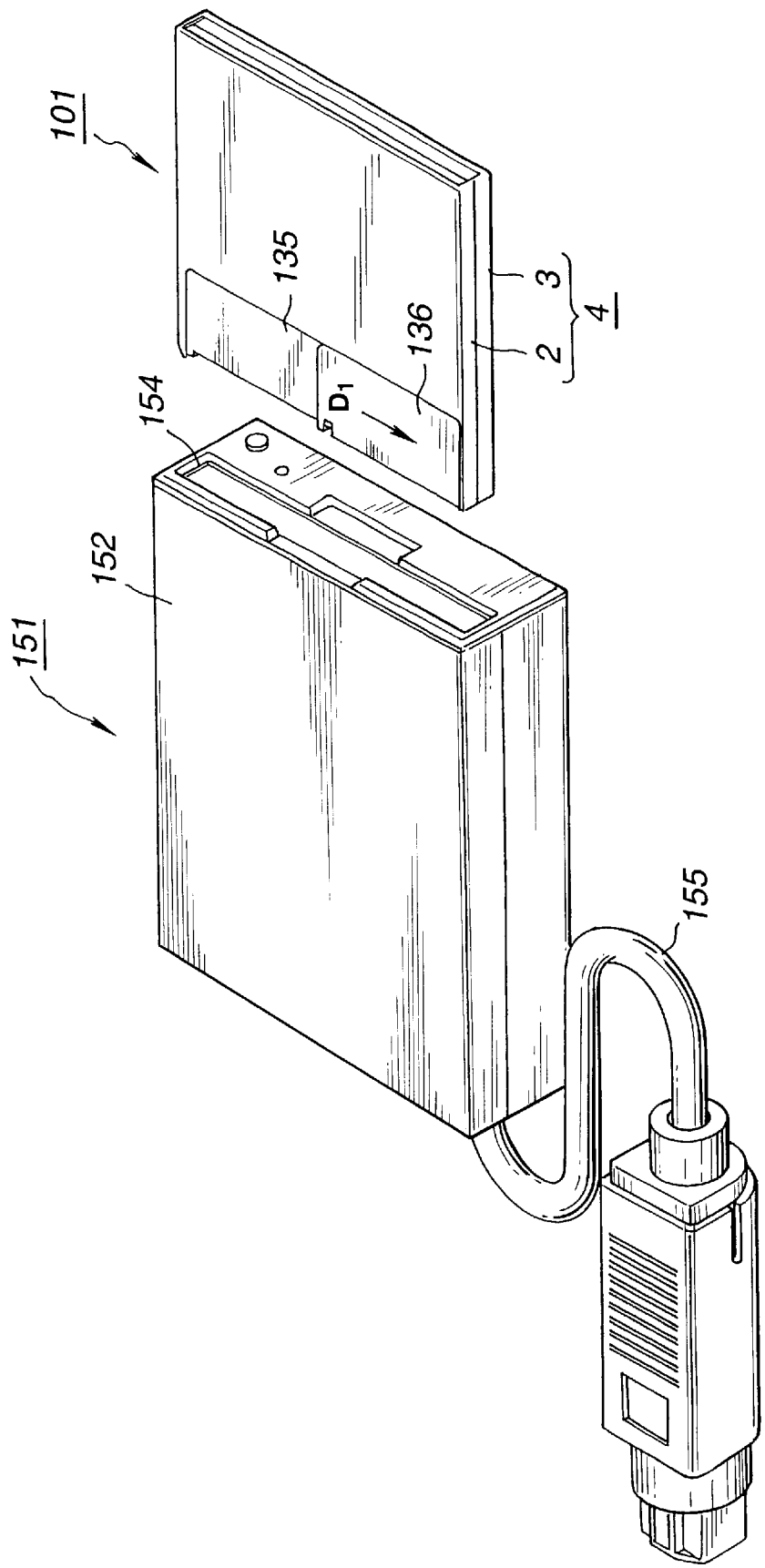
FIG. 24 is a perspective view of a disc cartridge embodying the present invention and a recording and/or reproducing apparatus loaded with the disc cartridge.
Figure 25:
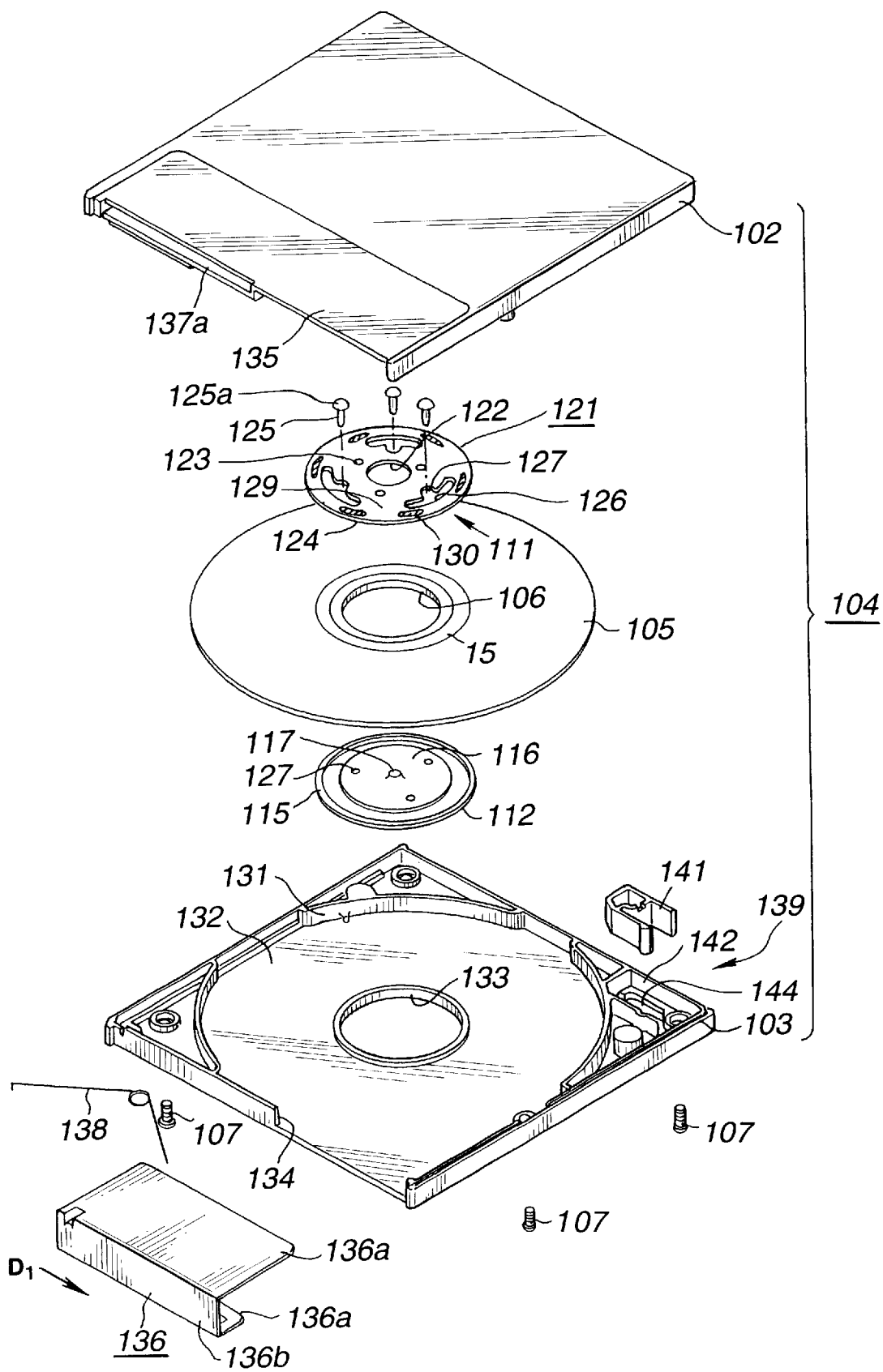
FIG. 25 is an exploded perspective view of the disc cartridge.

A disc cartridge 101, embodying the present invention, is explained with reference to FIGS. 24 to 27. This disc cartridge 101 includes a main cartridge body unit 104, obtained on coupling upper and lower cartridge halves 102, 103, abutted and connected to each other, as shown in FIGS. 24 and 25. There is housed in this main cartridge body unit 104 a magnetic disc 105 on which to record information signals.

The magnetic disc 105 has a disc substrate of, for example, synthetic resin, and a magnetic layer formed thereon. The magnetic disc 105 is also formed with a center opening 106 in which to mount a clamp mechanism 111 adapted to cause the magnetic disc 105 to rotate in unison with a disc rotating and driving mechanism 153 provided on the recording and/or reproducing apparatus. Meanwhile, the magnetic disc 105 is configured similarly to the above-described magnetic disc 3 and hence is depicted by the same reference numerals without being explained specifically.

Figure 26:
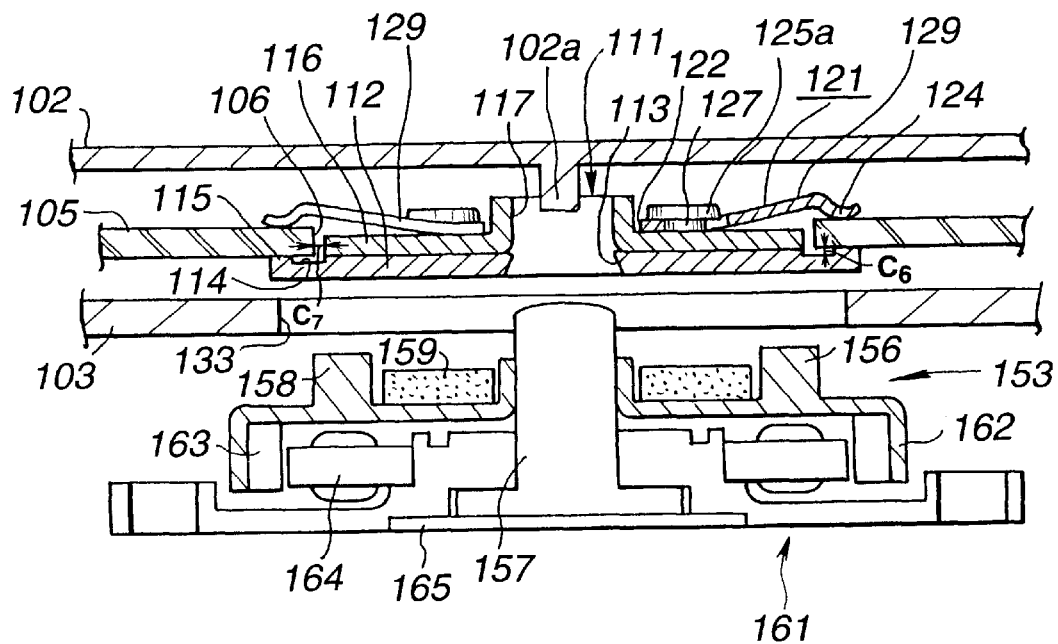
FIG. 26 is a cross-sectional view showing a rotation mechanism for causing the rotation of the magnetic disc.

The clamp mechanism 111, mounted in a center opening 106 of the magnetic disc 105, has a disc supporting member 112 adapted to support the rim of the center opening 106 of the magnetic disc 105, as shown in FIGS. 25 and 26. The disc supporting member 112 is formed by punching a magnetically attractable plate-shaped member, such as a metal plate, to a size capable of closing the center opening 106. The disc supporting member 112 is formed at a position facing the rim of the center opening 106 of the magnetic disc 105 with a cut-out 114 for clearing the projections 18 formed at the end of the center opening 106. That is, the cut-out 114 defines a gap C6 between the clamp region 15 of the magnetic disc 105 and the surface of the cutout 114 facing the clamp region 15 to prevent by this gap C6 the projections 18a, 18b produced on the inner rim end of the disc substrate from contacting with the disc supporting member 112, center plate 116 or the thrusting supporting member 121 during molding the disc substrate or cooling the disc substrate. Meanwhile, the gap C6 between the clamp region 15 of the magnetic disc 105 and the surface of the cutout 114 facing the clamp region 15 is e.g., not less than 0.02 mm.

The outer rim of the cut-out 114 of the disc supporting member 112 is provided with a support 115 for supporting the clamp region 15 of the magnetic disc 105. That is, the magnetic disc 105 is supported by the support 115 at a location spaced a pre-set distance from the inner rim end of the main body portion of the substrate 13, that is at the planar clamp region 15 thereof devoid of the projections 18 on the inner rim end of the main body portion of the substrate 13. This supports the magnetic disc 105 parallel to the disc supporting member 112. For example, the support 115 supports the magnetic disc 105 at a location spaced not less than 0.1 mm towards the outer rim from the projection 18a.

On the disc supporting member 112 is mounted an intermediate portion or intermediate member 116, such as by welding, as shown in FIG. 26. Similarly to the disc supporting member 112, the intermediate member 116 is formed by punching a metal plate to have an outside diameter slightly smaller than the center opening 106. The intermediate member 116 is provided with a cylindrical engagement opening 117 in register with a driving shaft insertion opening 117 engaged by a driving shaft of a rotation operating mechanism 153. In the engagement opening 117 is engaged a driving shaft of the rotation operating mechanism 153.

The intermediate member 116 is fitted loosely in the center opening 106, with a gap C7 being formed between the sidewall section of the center opening 106 and the outer peripheral surface of the intermediate member 116. This gap C7 operates for preventing the outer peripheral surface of the center opening 106 and the lateral surface of the intermediate member 116 from conflicting against each other even on contraction of the center opening 106 due to changes in temperature. Therefore, this gap C7 prevents the magnetic disc 3 from becoming warped when the lateral side of the center opening 106 contacts with the outer peripheral surface of the intermediate member 116.

The clamp mechanism 111 includes the thrusting supporting member 121 for thrusting the magnetic disc 105 towards the disc supporting member 112, as shown in FIGS. 25 and 26. The thrusting supporting member 121 is formed by punching a plate-shaped member, such as a spring plate, in a ring of a dimension sufficient to close the center opening 106 and to clamp the clamp region 15 on the outer rim region. The thrusting supporting member 121 has a positioning center opening 122 and a plurality of equiangular positioning openings 123 extending along its circumference. The thrusting supporting member 121 is arranged on a rim on the upper surface of the center opening 106 of the magnetic disc 105 by being fitted in a cylindrical section constituting the engagement opening 117, with positioning openings, not shown, being engaged by the intermediate member 116.

The thrusting supporting member 121 is formed as a spring plate elastically flexible in a direction perpendicular to the radial direction, and is provided on its outer rim side surface facing the magnetic disc 3 with a thrusting portion 124 adapted for thrusting the magnetic disc 105. The thrusting portion 124 is formed as a section having a substantially arcuate cross-section on a surface of the thrusting supporting member 121 facing the magnetic disc 105. When mounted on the disc supporting member 112, the thrusting portion 124 faces a supporting portion 115 of the disc supporting member 112. Thus, the thrusting portion 124 has a point contact with the clamp region 15 of the magnetic disc 10 so that it is slipped in the radial direction to prevent the magnetic disc 105 from being deteriorated in surface properties due to shifting of the contact portion with the clamp region 15.

When mounted by a set screw 125 on the disc supporting member 112, the thrusting portion 124 constitutes plural load concentrating sections 130 for thrusting the magnetic disc 105 with the clamp region 15 thereof towards the disc supporting member 112. The load concentrating sections 130 will be explained later in detail.

The thrusting portion 124 has its contact area with the clamp region 15 formed as a smooth surface with Rmax of e.g., to 0.4 $\mu$m or less. The contact surface of the thrusting portion 124 is formed by polishing. By so doing, the thrusting portion 124 permits the magnetic disc 105 to slip readily along the radius of the disc when the thrusting supporting member 121 is mounted on the disc supporting member 112, to prevent the magnetic disc 3 from becoming deteriorated in planarity as a result of shifting of the contact portion with the clamp region 15. It is noted that the magnetic disc 105 is formed by a disc substrate of a synthetic resin material, such that the magnetic disc undergoes expansion or contraction with changes in temperature. On the occasion of the expansion or contraction, the magnetic disc 3 is slipped with respect to the clamp region 15 to prevent the magnetic disc 3 from becoming deteriorated in surface properties due to the shifting of the contact portion with the clamp region 15.

The thrusting portion 124 may be formed to a surface roughness such that the maximum value of the difference the crests and recesses on its surface is 4 μm or less to render the thrusting portion 124 slippery with respect to the clamp region 15. The contact surface of the thrusting portion 124 may be coated with a surface coating material, especially a coating material exhibiting lubricity and resistance against abrasion, such as fluorine or Teflon, to render the contact surface slippery with respect to the clamp region 15.

In the thrusting portion 124 of the thrusting supporting member 121 is formed a through-hole 126 for constituting a load concentrating section for thrusting the magnetic disc 105. Specifically, plural through-holes 126 are formed equi-angularly in the circumferential direction of the thrusting supporting member 121 at a pre-set distance from the center of the thrusting supporting member 121. More specifically, the through-hole 126 is formed as a substantially arcuate elongate opening. The through-hole 126 is designed so that an angle a which a line interconnecting both ends of the through-hole 126 subtends the center of the thrusting supporting member 121 will be (360/2N)°. This angle is 60° in the case of the through-hole 36 shown in FIG. 14, with the number of the through-holes being three.

The through-hole 126 is provided with inwardly protruded pressuring sections 127 pressured against the disc supporting member 112 by the set screws 125. The pressuring section 127 is formed by cutting out the mid portion of the inner edge of the through-hole 126. Into this cut-out is engaged the set screw 125 serving for securing the thrusting supporting member 121 to the disc supporting member 112. The pressuring section 127 is thrust by a head 125a of the set screw 125 into pressure contact with the disc supporting member 112. The disc supporting member 112 is formed with a tapped hole, not shown, in register with the pressuring section 127. The thrusting supporting member 121 is secured to the disc supporting member 112 by the set screw 125 being inserted through the pressuring section 127 into threaded engagement with the tapped hole. Since the pressuring section 127 is provided on the inner rim of the through-hole 126, the head 125a of the set screw 125 is not abutted against its outer rim.

The thrusting supporting member 121 is provided with plural load transmitting sections 129 between the neighboring through-holes 126 for transmitting the load of the pressuring section 127 to the thrusting portion 124. The load transmitting sections 129 are elastically warped towards the magnetic disc 105, about the thrusting portion 124 as center, by the pressuring section 127 being thrust by the head 125a of the set screw 125, to transmit the load at the pressuring section 127 to the thrusting portion 124. At this time, the thrusting portion 124 is moved from the inner rim side to the outer rim side of the thrusting supporting member 121 by the load concentrating section 130 being elastically actuated towards the magnetic disc 105. The thrusting portion 124 is formed in the vicinity of both ends of the through-hole 126 with the load concentrating section 130 where there is concentrated the load thrusting the magnetic disc 105.

Six of the above-described load concentrating sections 130 are formed in the vicinity of both ends of the through-holes 126 with equal loads. That is, the number of the load concentrating sections 130 is twice that of the set screws 125 used for securing the thrusting supporting member 121 to the disc supporting member 112. The result is that the load is distributed to reduce the load per load concentrating section 130. Also, in the load concentrating sections 130, there are provided through-holes 126 outwardly of the pressuring sections 127 to increase the length of the pressuring sections 127 and the thrusting portions 124 to reduce the load applied on the load concentrating sections 130.

The above-described clamp mechanism 111 clamps the magnetic disc 105 by the intermediate member 116 being loosely fitted in the center opening 106 of the magnetic disc 105, by the supporting section 115 supporting the magnetic disc 105 by the lower surface of the clamp region 15, by the thrusting supporting member 121 being arranged on the clamp region 15 on the upper surface of the magnetic disc 105 and by securing the thrusting supporting member 121 by the set screws 125. At this time, the head 125a of the set screw 125 pressures the pressuring section 127 against the disc supporting member 112. At this time, the load transmitting sections 129 is elastically warped towards the magnetic disc 105, about the thrusting portion 124 as center, by the pressuring section 127 being thrust by the head 125a of the set screw 125, for transmitting the loads at the pressuring section 127 to the thrusting portion 124. At this time, the thrusting portion 124 is moved from the outer rim towards the inner rim of the thrusting supporting member 121 due to the elastic warping of the load transmitting sections 129. In the vicinity of the through-holes 126 in the thrusting portion 124, there are evenly formed the load concentrating sections 130. In the load concentrating sections 130, the through-holes 126 are formed on the outer rim side of the pressuring section 127 to increase the length of the pressuring section 127 and the thrusting portion 124, the load in the load concentrating sections 130 is reduced to prevent the local deformation along the thickness of the magnetic disc 105.

Figure 27:
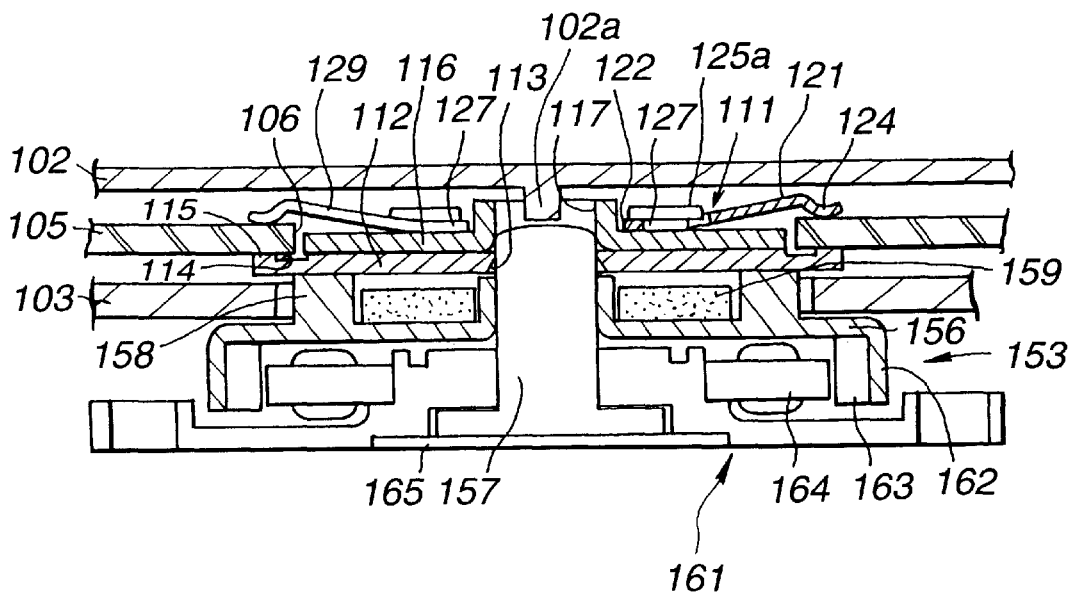
FIG. 27 is a cross-sectional view showing the state in which the disc cartridge has been mounted on the disc rotating driving unit.

The upper and lower cartridge halves 102, 103, constituting the main cartridge body unit 104, rotatably accommodating the magnetic disc 105, carrying the above-described clamp mechanism 111, are formed of a synthetic resin material having satisfactory moldability and sufficient mechanical strength, as shown in FIGS. 26 and 27. In a mid portion of the inner surface of the upper cartridge half 2 is formed a position regulating projection 102a engaged with the engagement opening 117 for regulating the position of the magnetic disc 105. On the facing inner surfaces of the upper and lower cartridge halves 102, 103 are formed partitioning wall sections 131 for housing the disc 105 to be accommodated in the main cartridge body unit 104. The partitioning wall sections 131 are provided to inscribe upstanding peripheral wall sections 102a, 103a set upright around the upper and lower cartridge halves 102, 103, so that, when the upper and lower cartridge halves 102, 103 are abutted and connected to each other by set screws 107 or the like to constitute the main cartridge body unit 104, there is delimited a disc housing unit 132 for rotatably housing the magnetic disc 105 to prevent mixing with the dust and dirt from atmospheric air.

The lower cartridge half 103 is provided with a center opening 133 used for facing the clamp mechanism 111 to outside. From this center opening 133 is intruded a rotation operating mechanism 153 adapted for rotating the magnetic disc 105 on the recording and/or reproducing apparatus. When the upper and lower cartridge halves 102, 103 are combined together, there is formed, in upstanding peripheral wall sections 102a, 103a on the front side of the main cartridge body unit 104, as the inserting end into the recording and/or reproducing apparatus, a recording and/or reproducing aperture 134 in which the magnetic head apparatus adapted for recording and/or reproducing information signals on or from the magnetic disc 105 is intruded. The aperture 134 is closed by a shutter member 136 mounted for movement along the front side of the main cartridge body unit 4. On the front sides of the upper and lower cartridge halves 102, 103, there is formed a shutter movement portion 135 along which is moved a shutter member 136 adapted to close the aperture 134.

The shutter member 136, assembled on the shutter movement portion 135, is of a substantially U-shaped cross-section, as shown in FIGS. 24 and 25. This shutter member 136 includes a pair of guide plates 136a and a shutter plate portion 136b interconnecting the guide plates 136a. The shutter plate portion 136b closes the aperture 134. The shutter plate portion 136b includes, at its one end, a guide piece 137 for guiding the movement of the shutter plate portion 136b. This guide piece 137 is engaged in a guide groove 137a formed in the front side of the main cartridge body unit 104. The shutter member 136 is biased by a spring 138 in a direction of closing the aperture 134 by a spring 138. The spring 138 biases the shutter member 136 in the direction indicated by arrow D1 in FIGS. 24 and 25 by having its one end retained by the front side of the main cartridge body unit 104 and by having its other end by the shutter member 136. This shutter member 136 opens the aperture 134 only when the main cartridge body unit is loaded in the recording and/or reproducing apparatus 151 to prevent foreign matter such as dust and dirt from being intruded into the inside of the disc housing unit 132 during the non-use time when the main cartridge body unit is not loaded in the recording and/or reproducing apparatus 151.

On the back surface of the main cartridge body unit 104 opposite to its front surface carrying the shutter member 136, there is provided a mistaken recording inhibiting mechanism 139 for preventing recorded information signals on the magnetic disc 105 from being erased inadvertently. This mistaken recording inhibiting mechanism 139 includes a mistaken recording inhibiting member 141 as shown in FIG. 25. The mistaken recording inhibiting member 141 is movably accommodated in a housing section 142 provided on the back side of the lower cartridge half 103. The housing section 142 is provided with a detection opening 144 having the function as a detection opening for detecting the non-recordable state and which is used for causing the movement of the mistaken recording inhibiting member 141. In the non-recordable state, the mistaken recording inhibiting mechanism 139 is at the position of closing the detection opening 144. The mistaken recording can be prevented by the detection mechanism of the recording and/or reproducing apparatus detecting the closed state of the detection opening 144. When recording the information signals on the magnetic disc 105, the mistaken recording inhibiting member 141 is moved for opening the detection opening 144. The recording of the information signals is permitted by detection of the opened state of the detection opening 144.

Meanwhile, the recording and/or reproducing apparatus 151 for recording and/or reproducing the disc cartridge 101 includes a casing 152 constituting the main body portion of the apparatus, as shown in FIG. 24. The disc cartridge 101 is loaded in the casing 152, whilst the rotation operating mechanism 153 for rotationally driving the magnetic disc 105 rotationally housed in the main cartridge body unit 104 is arranged in the casing 12. In the front side of the casing 152 is formed an insertion/ejection opening 154 for insertion/ejection of the disc cartridge 101 loaded on the recording and/or reproducing apparatus. An external connection cord 155 is led out from the casing 152 for connection to an external apparatus.

The rotation operating mechanism 153 of the recording and/or reproducing apparatus for rotationally driving the magnetic disc 105 includes a disc table 156 for rotationally supporting the magnetic disc 105 by the clamp mechanism 111, as shown in FIG. 26. The disc table 156 has a driving shaft inserting center opening 113 for the disc supporting member 112 and includes a driving shaft engaged in the engagement opening 117 of the intermediate member 116. On the outer rim of the driving shaft 157, there is provided a disc support 158 for supporting the magnetic disc 105. On the inner rim of the disc support 158, there is provided a ring-shaped magnet 159 for generating a uniform magnetic field about the driving shaft 157. When the disc cartridge 101 is loaded on the rotation operating mechanism 153 in the recording and/or reproducing apparatus, the magnet 159 of the rotation operating mechanism 153 magnetically attracts the disc supporting member 112 of the clamp mechanism 111 to effect magnetic chucking to support the magnetic disc 105 in a rotatable state.

This disc table 156 is run in rotation by a driving unit 161 adapted to rotate the disc table 156. This driving unit 161 includes a rotor 162 mounted depending on the outer rim end of the disc table 156, a magnet 163 arranged on the inner surface of the rotor 162 for generating a magnetic field, and a driving coil 164 arranged on the stator 165 for facing the magnet 163, as shown in FIG. 21. The driving coil 157 is supported by the bearing of the stator 165. When the driving current is fed to the driving coil 164, the disc table 156 is run in rotation along with the rotor 162 by the interaction of the driving current supplied to the driving coil 164 and the magnetic field generated by the magnet 163.

The relationship between the chucking force of chucking the magnetic disc 105 by the rotation operating mechanism 153 and the total thrusting force is set as follows: If the force with which the rotation operating mechanism 153 magnetically attracts the magnetic disc 105 to effect magnetic chuck is M and the total thrusting force with which the thrusting supporting member 121 thrusts the magnetic disc 105 is F, M<F. Thus, it is possible to prevent the situation in which the chuck by the magnetic disc 105 is released to permit the magnetic disc 105 to be offset relative to the clamp mechanism 111 when the magnetic disc 105 is chucked by the rotation operating mechanism 153 even if the impact is applied thereto. If, when the magnetic disc 105 is loaded on the rotation operating mechanism 153, the magnetic chuck is disengaged due to e.g., impact, no adverse effect is produced on the operation of the recording and/or reproducing apparatus.

If such disc cartridge 101 is in a non-use state, that is if the disc cartridge 101 is not loaded on the recording and/or reproducing apparatus 151, the shutter member 136 is in a position closing the aperture 134, to prevent dust and dirt from being intruded into the aperture 134. If the disc cartridge 101 is introduced via the insertion/ejection opening 154 into the casing 152, with its front side carrying the shutter member 136 as an inserting end, the shutter member 136 is moved in a direction perpendicular to the inserting direction of the disc cartridge 1, opposite to the direction of insertion into the recording and/or reproducing apparatus, by a shutter opening mechanism provided on the recording and/or reproducing apparatus 151, to open the aperture 134.

At this time, the driving shaft 157 is passed through the driving shaft inserting opening 113 formed in the disc supporting member 112 into engagement with the engagement opening 117 of the intermediate member 116, so that the disc cartridge 101 is magnetically chucked by the magnet 159 provided on the disc table 156 to permit rotation of the disc cartridge 101 in unison with the disc table 156. Then, a magnetic head, constituting the recording and/or reproducing mechanism provided on the recording or reproducing apparatus 151, is intruded into the disc cartridge 101 via the opening 134. This causes the magnetic head to record and/or reproduce information signal on or from the rotating magnetic disc 105.

The environmental temperature, to which the magnetic disc 105 is exposed, experiences a large temperature differential between the temperature during non-use time and the temperature at the time the magnetic disc is loaded on the recording and/or reproducing apparatus 151 and hence a broad compensation temperature range. Thus, if the environmental temperature of the magnetic disc 105 is changed, the magnetic disc 105, formed of a synthetic resin material, undergoes expansion and contraction in the radial direction. Since the gap C7 is formed between the lateral side of the center opening 106 of the magnetic disc 105 and the outer peripheral surface of the intermediate member 116, it is possible in such case to prevent the lateral side of the center opening 106 and the outer peripheral surface of the intermediate member 116 from coming into contact with each other even if the center opening 106 is reduced in diameter.

Also, since the gap C6 is formed between the clamp region 15 of the magnetic head 105 and the surface of the cut-out 114 facing the clamp region 15, and the clamp mechanism 111 supports the magnetic disc 3 with a pre-set distance in-between, it is possible to prevent the projections 18a, 18b from conflicting against the disc supporting member 112, intermediate member 116 and the thrusting supporting member 121.

Also, the thrusting supporting member 121 thrusts the magnetic disc 105 in a direction perpendicular to the disc surface of the magnetic disc 105. The thrusting supporting member 121 is formed to a substantially arcuate cross-section, and has a smooth contact surface with the magnetic disc 105. Moreover, the load concentrating sections 130, formed at equiangular intervals on the circumference of the thrusting supporting member 121 of the thrusting supporting member 121 experiences reduced load. Therefore, the magnetic disc 105 is able to be contracted smoothly when subjected to temperature changes to prevent the magnetic disc 105 from being affected in planarity due to dragging as well as to prevent the surface of the rotating magnetic disc from departing from true planarity.

In the foregoing description, a sole magnetic disc 105 is accommodated in the main cartridge body unit 104. The present invention is, however, not limited to this embodiment and can be configured so that plural magnetic discs are accommodated in the main cartridge body unit 104. In such case, it suffices if a shank inserted into the center opening 106 is provided on the disc supporting member 112., the plural magnetic discs are mounted on this shank and a spacer is provided between neighboring magnetic discs to provide a pre-set gap which is only wide enough to permit the intrusion of the magnetic head therein.

It is also possible to provide offset correction servo control 72 on the rotation operating mechanism. It is also possible to provide a clamp area 77 on the upper surface of the magnetic disc 105 at a level slightly lower than the signal recording region 14 of the main body portion of the substrate 13 to provide non-symmetrical upper and lower disc surfaces.

The disc cartridge 101 may also be configured so that a concentrated load releasing member 82 for releasing the concentrated load on the magnetic disc 105 is provided between the magnetic disc 105 and the thrusting supporting member 121, as shown in FIG. 23. By so doing, the concentrated load may be distributed when the thrusting force the thrusting supporting member 121 thrusts the magnetic disc 105 to permit the thrusting force to be evenly applied to the surface of the magnetic disc 105.

INDUSTRIAL APPLICABILITY

The present invention provides a disc-shaped recording medium in which information signals are recorded and/or reproduced in a state in which a recording and/or reproducing head is floated a pre-set distance from a signal recording region carrying surface of the rotating magnetic disc. The disc-shaped recording medium having a signal recording region exhibiting high planarity on each surface thereof has its area coplanar with said signal recording region at least 0.1 mm spaced apart from the outer perimeter of its center opening held by a clamp mechanism, so that, when the magnetic recording medium is run in rotation, the disc is not offset to prevent the recording and/or reproducing head from colliding against the disc-shaped recording medium.

What is claimed is:

1. In combination, a disc-shaped recording medium including a substrate molded from a synthetic resin, said substrate having a center opening, in which a signal recording region is formed on at least one surface thereof, and in which information signals are recorded and/or reproduced in a state in which a rotating recording and/or reproducing head is floated a pre-set distance from the surface carrying said signal recording region to record and/or reproduce the information signals for the disc-shaped recording medium; and a clamp mechanism including a supporting member arranged on one of the surfaces of said disc-shaped recording medium for supporting said one surface around said center opening and a thrusting supporting member arranged on the other surface of said disc-shaped recording medium for supporting said other surface around said center opening;

said clamp mechanism being mounted on said disc-shaped recording medium as it clamps an area of said disc-shaped recording medium radially outside of the outer perimeter of the center opening by at least 0.1 mm or more, said area being coplanar with each surface of the disc-shaped recording medium carrying said signal recording region;

wherein the contact portion of said supporting member and/or the thrusting supporting member has a maximum value of surface roughness not larger than 4 μm.

2. The combination according to claim 1 wherein said supporting member has a cut-out which evades a projection produced in the disc-shaped recording medium around the perimeter of the center opening, said cut-out being formed radially inwardly of a supporting portion provided on an outer rim side of said supporting member for supporting said disc-shaped recording medium.

3. The combination according to claim 2 wherein said cut-out is spaced by not less than 0.02 mm from the surface of said disc-shaped recording medium.

4. The combination according to claim 1, wherein said clamp mechanism is mounted on the disc-shaped recording medium as it clamps the same site on each surface of the disc-shaped recording medium.

5. The combination according to claim 1, wherein said thrusting supporting member is formed by a plate spring member.

6. The combination according to claim 1, wherein said thrusting supporting member is formed with an arcuate thrusting portion on its outer rim side for thrusting the other surface of the disc-shaped recording medium.

7. The combination according to claim 1, wherein a coating material is applied to the contact portion of said supporting member and/or the thrusting supporting member.

8. The combination according to claim 7 wherein said coating material has lubricating properties for improving the slip with respect to the disc-shaped recording medium.

9. The combination according to claim 7 wherein said coating material exhibits resistance against abrasion.

10. The combination according to claim 1 wherein the cross-sectional shape of an area of said disc-shaped recording medium carrying said clamp mechanism exhibits vertical symmetry.

11. The combination according to claim 1, wherein said clamp mechanism has an intermediate portion which is inserted into a center opening of the disc-shaped recording medium and wherein a gap is formed between the intermediate portion and the center opening for preventing said intermediate portion from colliding against the center opening when said disc-shaped recording medium is contracted to reduce the size of said center opening.

12. The combination according to claim 11 wherein said intermediate portion is a shank of the supporting member, and an eccentricity preventative member for evenly thrusting the lateral side of the center opening towards the outer periphery of the disc-shaped recording medium for preventing eccentricity of said disc-shaped recording medium is arranged between the center opening and the shank.

13. The combination according to claim 11 wherein a load concentration releasing member is provided between the contact portion of said thrusting supporting member and said disc-shaped recording medium for releasing the load concentration of said thrusting supporting member.

14. The combination according to claim 13 wherein the inner periphery of a contact portion of said load concentration releasing member is formed with a cut-out for evading a projection produced in the disc-shaped recording medium on the outer periphery of said center opening.

15. The combination according to claim 14 wherein said cut-out is spaced apart by not less than 0.02 mm from the surface of said disc-shaped recording medium.

16. The combination according to claim 13 wherein a contact portion of said load concentration releasing member with the disc-shaped recording medium has a maximum value of surface roughness of not larger than 4 $\mu$m.

17. The combination according to claim 13 wherein a contact portion of said load concentration releasing member with the disc-shaped recording medium has a surface roughness Rmax of not larger than 0.4 $\mu$m.

18. The combination according to claim 1, wherein said clamp mechanism includes an intermediate member arranged in said center opening in said disc-shaped recording medium between said supporting member and the thrusting supporting member, there being a gap formed between said intermediate member and said center opening to prevent said intermediate member from interfering with said center opening when the disc-shaped recording medium is contracted to reduce the size of said center opening.

19. The combination according to claim 18 wherein a load concentration releasing member is provided between the contact portion of said thrusting supporting member and the disc-shaped recording medium for releasing the load concentration of said thrusting supporting member.

20. The combination according to claim 18 wherein an eccentricity preventative member is provided between the center opening and the intermediate member for evenly thrusting the lateral side of said center opening towards the outer periphery of said disc-shaped recording medium for preventing the eccentricity of said disc-shaped recording medium.

21. In combination, a disc-shaped recording medium including a substrate molded from a synthetic resin, said substrate having a center opening, in which a signal recording region is formed on at least one surface thereof, and in which information signals are recorded and/or reproduced in a state in which a rotating recording and/or reproducing head is floated a pre-set distance from the surface carrying said signal recording region to record and/or reproduce the information signals for the disc-shaped recording medium; and a clamp mechanism including a supporting member arranged on one of the surfaces of said disc-shaped recording medium for supporting said one surface around said center opening and a thrusting supporting member arranged on the other surface of said disc-shaped recording medium for supporting said other surface around said center opening;

said clamp mechanism being mounted on said disc-shaped recording medium as it clamps an area of said disc-shaped recording medium radially outside of the outer perimeter of the center opening by at least 0.1 mm or more , said area being coplanar with each surface of the disc-shaped recording medium carrying said signal recording region;

wherein the contact portion of said supporting member and/or the thrusting supporting member has a surface roughness Rmax not larger than 0.4 $\mu$m.

22. In combination, a disc-shaped recording medium including a substrate molded from a synthetic resin, said substrate having a center opening, in which a signal recording region is formed on at least one surface thereof, and in which information signals are recorded and/or reproduced in a state in which a rotating recording and/or reproducing head is floated a pre-set distance from the surface carrying said signal recording region to record and/or reproduce the information signals for the disc-shaped recording medium; and a clamp mechanism including a supporting member arranged on one of the surfaces of said disc-shaped recording medium for supporting said one surface around said center opening and a thrusting supporting member arranged on the other surface of said disc-shaped recording medium for supporting said other surface around said center opening;

said clamp mechanism being mounted on said disc-shaped recording medium as it clamps an area of said disc-shaped recording medium radially outside of the outer perimeter of the center opening by at least 0.1 mm or more, said area being coplanar with each surface of the disc-shaped recording medium carrying said signal recording region;

wherein said thrusting supporting member is formed with an arcuate thrusting portion on its outer rim side for thrusting the other surface of the disc-shaped recording medium; and wherein a contact area of said disc-shaped recording medium with the contact portion of said supporting member and/or the thrusting supporting member has a maximum value of surface roughness not larger than 4 μm.

23. A clamp mechanism for a disc-shaped recording medium having a center opening, comprising:

a supporting member arranged on one of the surfaces of said disc-shaped recording medium for supporting said one surface around said center opening and a thrusting supporting member arranged on the other surface of said disc-shaped recording medium for supporting said other surface around said center opening;

said supporting member and the thrusting supporting member clamping an area of said disc-shaped recording medium radially outside of an outer perimeter of said center opening by at least 0.1 mm, said area being coplanar with each surface of the disc-shaped recording medium carrying said signal recording region;

wherein a contact portion of the supporting member and/or the thrusting supporting member with the disc-shaped recording medium has a maximum value of surface roughness of not larger than 4 μm.

24. The clamp mechanism according to claim 23, wherein said thrusting supporting member is formed by a plate spring member.

25. The clamp mechanism according to claim 23, wherein said supporting member includes a cut-out for evading a projection produced around said center opening of the recording medium.

26. The clamp mechanism according to claim 25 wherein said cut-out has a depth not less than 0.02 mm.

27. The clamp mechanism according to claim 23, wherein the clamp mechanism clamps the same site of each surface of the disc-shaped recording medium.

28. The clamp mechanism according to claim 23, wherein said thrusting supporting member includes, on its outer rim side, a substantially arcuate thrusting portion for thrusting the other surface of the disc-shaped recording medium.

29. The clamp mechanism according to claim 23, wherein the clamp mechanism includes an intermediate member arranged in said center opening in said disc-shaped recording medium between said supporting member and the thrusting supporting member, there being a gap formed between said intermediate member and said center opening to prevent said intermediate member from interfering with said center opening when the disc-shaped recording medium is contracted to contract said center opening.

30. The clamp mechanism according to claim 29 wherein if the total thrusting force with which the thrusting supporting member thrusts the disc-shaped recording medium is F, and the force with which a disc rotation operating mechanism rotationally driving the disc-shaped recording medium chucks the disc-shaped recording medium is M, the relationship M<F holds.

31. A clamp mechanism for a disc-shaped recording medium having a center opening, comprising:

a supporting member arranged on one of the surfaces of said disc-shaped recording medium for supporting said one surface around said center opening and a thrusting supporting member arranged on the other surface of said disc-shaped recording medium for supporting said other surface around said center opening;

said supporting member and the thrusting supporting member clamping an area of said disc-shaped recording medium radially outside of an outer perimeter of said center opening by at least 0.1 mm, said area being coplanar with each surface of the disc-shaped recording medium carrying said signal recording region;

wherein a contact portion of said supporting member and/or the thrusting supporting member with the disc-shaped recording medium has a surface roughness Rmax of not larger than 0.4 μm.

32. A clamp mechanism for a disc-shaped recording medium having a center opening, comprising:

a supporting member arranged on one of the surfaces of said disc-shaped recording medium for supporting said one surface around said center opening and a thrusting supporting member arranged on the other surface of said disc-shaped recording medium for supporting said other surface around said center opening;

said supporting member and the thrusting supporting member clamping an area of said disc-shaped recording medium radially outside of an outer perimeter of said center opening by at least 0.1 mm, said area being coplanar with each surface of the disc-shaped recording medium carrying said signal recording region;

wherein a coating material is applied to a contact portion of the supporting member and/or the thrusting supporting member with the disc-shaped recording medium.

33. The clamp mechanism according to claim 32 wherein said coating material has lubricity for improving the slip thereof with respect to the disc-shaped recording medium.

34. The clamp mechanism according to claim 32 wherein said coating material exhibits resistance against abrasion.

35. A clamp mechanism for a disc-shaped recording medium having a center opening, comprising:

a supporting member arranged on one of the surfaces of said disc-shaped recording medium for supporting said one surface around said center opening and a thrusting supporting member arranged on the other surface of said disc-shaped recording medium for supporting said other surface around said center opening;

said supporting member and the thrusting supporting member clamping an area of said disc-shaped recording medium radially outside of an outer perimeter of said center opening by at least 0.1 mm, said area being coplanar with each surface of the disc-shaped recording medium carrying said signal recording region;

wherein an intermediate portion is inserted into a center opening of the disc-shaped recording medium and wherein a gap is formed between the intermediate portion and the center opening for preventing said intermediate portion from colliding against the center opening when said disc-shaped recording medium is contracted to reduce the size of said center opening.

36. The clamp mechanism according to claim 35 wherein said intermediate portion comprises a shank of the supporting member; and said disc-shaped recording medium comprises a plurality of disc-shaped recording mediums arranged in tiers with the disc surfaces parallel to one another, there being a spacer between neighboring disc-shaped recording mediums, said spacer being passed through by said shank to support said disc-shaped recording mediums at a pre-set spacing from each other, said supporting member supporting the one surface of the lowermost disc-shaped recording medium, said thrusting supporting member supporting the other surface of the uppermost disc-shaped recording medium.

37. The clamp mechanism according to claim 36 wherein the total thrusting pressure with which the thrusting supporting member thrusts the disc-shaped recording medium is given by $$W \times G \leq F < W \times G / 2\mu$$

where F is the total thrusting pressure, W the total weight of the disc-shaped recording medium, G the acceleration on shock application during non-operation of the disc drive device, and μ the frictional coefficient between the disc-shaped recording medium and the thrusting supporting member, with the frictional coefficient on the upper and lower surfaces of the magnetic disc being 2μ.

38. A clamp mechanism for a disc-shaped recording medium having a center opening, comprising:

a supporting member arranged on one of the surfaces of said disc-shaped recording medium for supporting said one surface around said center opening and a thrusting supporting member arranged on the other surface of said disc-shaped recording medium for supporting said other surface around said center opening;

said supporting member and the thrusting supporting member clamping an area of said disc-shaped recording medium radially outside of an outer perimeter of said center opening by at least 0.1 mm, said area being coplanar with each surface of the disc-shaped recording medium carrying said signal recording region;

wherein said thrusting supporting member includes a thrusting portion on the outer rim side thereof for thrusting said disc-shaped recording medium, pressuring portions distributed in the circumferential direction for being pressured against the supporting member by a fastening member fastening the thrusting supporting member to said supporting member, a plurality of through-holes distributed in the circumferential direction, said through-holes lying more radially outwardly than the pressuring portions, and load transmitting portions arranged between the through-holes, said load transmitting portions being elastically flexed about said pressuring portions as center by said pressuring portions being pressured by said fastening member to transmit the load at said pressuring portions to said thrusting portion;

there being evenly formed in the vicinity of both end extremities of said through-holes load concentrating portions for thrusting said disc-shaped recording medium when the pressuring portions are pressured against the supporting member.

39. The clamp mechanism according to claim 38 wherein said pressuring portions are equiangularly formed in the circumferential direction.

40. The clamp mechanism according to claim 38 wherein said through-holes are substantially arcuate elongate openings, said pressuring portions being provided at mid portions of the inner rim side edges of the through-holes, said load concentrating portions being formed in the vicinity of both end extremities of said through-holes.

41. The clamp mechanism according to claim 38 wherein further through-holes are formed in the thrusting supporting member in the circumferential direction on the outer peripheral sides of said pressuring portions and further load concentrating portions are formed in said thrusting portion in the vicinity of both end extremities of the through-holes.

42. A disc drive apparatus comprising:

a clamp mechanism including an intermediate portion inserted through a center opening in a disc-shaped recording medium, a supporting member having a supporting portion on one surface of the disc-shaped recording medium for supporting said one surface of the disc-shaped recording medium around said center opening, and a thrusting supporting member arranged on the other surface of the disc-shaped recording medium for supporting the other surface of the disc-shaped recording medium around said center opening;

a disc rotation operating mechanism for rotationally driving said disc-shaped recording medium; and a recording and/or reproducing head for performing recording and/or reproduction in a state in which the head is floated a pre-set distance from a signal recording region carrying surface of the rotating disc-shaped recording medium;

said clamp mechanism being mounted on said disc-shaped recording medium as it clamps an area of said disc-shaped recording medium radially outside of the outer perimeter of the center opening by at least 0.1 mm, said area being coplanar with each surface of the disc-shaped recording medium carrying said signal recording region;

wherein a contact portion of the supporting member and/or the thrusting supporting member with the disc-shaped recording medium has the maximum value of surface roughness of not larger than 4 μm.

43. The disc drive apparatus according to claim 42, wherein said intermediate portion comprises a shank; and said disc-shaped recording medium comprises a plurality of disc-shaped recording mediums arranged in tiers with the disc surfaces parallel to one another, there being a spacer between neighboring disc-shaped recording mediums, said spacer being passed through by said shank to support said disc-shaped recording mediums at a pre-set spacing from each other, said supporting member supporting the one surface of the lowermost disc-shaped recording medium, said thrusting supporting member supporting the other surface of the uppermost disc-shaped recording medium.

44. The disc drive apparatus according to claim 43 wherein said spacer includes, on an inner rim side of the outer peripheral side supporting portion for supporting the recording medium, a cut-out for evading a projection produced around said center opening of the recording medium.

45. The disc drive apparatus according to claim 44 wherein said cut-out has a depth not less than 0.02 mm.

46. The disc drive apparatus according to claim 44 wherein a coating material is applied to a contact portion of the supporting member or the thrusting supporting member with the disc-shaped recording medium.

47. The disc drive apparatus according to claim 46 wherein said coating material has lubricity for improving the slip thereof with respect to the disc-shaped recording medium.

48. The disc drive apparatus according to claim 46 wherein said coating material exhibits resistance against abrasion.

49. The disc drive apparatus according to claim 42, wherein said supporting member includes a cut-out for evading a projection produced around said center opening of the recording medium.

50. The disc drive apparatus according to claim 49 wherein said cut-out has a depth not less than 0.02 mm.

51. The disc drive apparatus according to claim 42, wherein the clamp mechanism clamps the same site of each surface of the disc-shaped recording medium.

52. The disc drive apparatus according to claim 42, wherein said thrusting supporting member is formed by a plate spring member.

53. The disc drive apparatus according to claim 42, wherein said thrusting supporting member includes, on its outer rim side, a substantially arcuate thrusting portion for thrusting the other surface of the disc-shaped recording medium.

54. The disc drive apparatus according to claim 42, wherein said disc rotation operating mechanism is detachably coupled with said clamp mechanism for rotationally driving said disc-shaped recording medium.

55. The disc drive apparatus according to claim 42, wherein said disc rotation operating mechanism fixedly carries said clamp mechanism mounting said disc-shaped recording medium.

56. A disc drive apparatus comprising:
a clamp mechanism including an intermediate portion inserted through a center opening in a disc-shaped recording medium, a supporting member having a supporting portion on one surface of the disc-shaped recording medium for supporting said one surface of the disc-shaped recording medium around said center opening, and a thrusting supporting member arranged on the other surface of the disc-shaped recording medium for supporting the other surface of the disc-shaped recording medium around said center opening;
a disc rotation operating mechanism for rotationally driving said disc-shaped recording medium; and
a recording and/or reproducing head for performing recording and/or reproduction in a state in which the head is floated a pre-set distance from a signal recording region carrying surface of the rotating disc-shaped recording medium;
said clamp mechanism being mounted on said disc-shaped recording medium as it clamps an area of said disc-shaped recording medium radially outside of the outer perimeter of the center opening by at least 0.1 mm, said area being coplanar with each surface of the disc-shaped recording medium carrying said signal recording region;
wherein a contact portion of said supporting member and/or the thrusting supporting member with the disc-shaped recording medium has a surface roughness Rmax of not larger than 0.4 μm.

57. A disc drive apparatus comprising:
a clamp mechanism including an intermediate portion inserted through a center opening in a disc-shaped recording medium, a supporting member having a supporting portion on one surface of the disc-shaped recording medium for supporting said one surface of the disc-shaped recording medium around said center opening, and a thrusting supporting member arranged on the other surface of the disc-shaped recording medium for supporting the other surface of the disc-shaped recording medium around said center opening;
a disc rotation operating mechanism for rotationally driving said disc-shaped recording medium; and
a recording and/or reproducing head for performing recording and/or reproduction in a state in which the head is floated a pre-set distance from a signal recording region carrying surface of the rotating disc-shaped recording medium;
said clamp mechanism being mounted on said disc-shaped recording medium as it clamps an area of said disc-shaped recording medium radially outside of the outer perimeter of the center opening by at least 0.1 mm, said area being coplanar with each surface of the disc-shaped recording medium carrying said signal recording region;
wherein a coating material is applied to a contact portion of the supporting member and/or the thrusting supporting member with the disc-shaped recording medium.

58. The disc drive apparatus according to claim 57 wherein
said coating material has lubricity for improving the slip thereof with respect to the disc-shaped recording medium.

59. The disc drive apparatus according to claim 57 wherein
said coating material exhibits resistance against abrasion.

60. The disc drive apparatus according to claim 57, wherein the contact portion of the supporting member or the thrusting supporting member with the disc-shaped recording medium has a maximum value of surface roughness of not larger than 4 μm.

61. The disc drive apparatus according to claim 57, wherein the contact portion of said supporting member or the thrusting supporting member with the disc-shaped recording medium has a surface roughness Rmax of not larger than 0.4 μm.

62. A disc drive apparatus comprising:
a disc-shaped recording medium including a substrate molded from a synthetic resin, said substrate having a center opening, there being a signal recording region formed on at least one surface thereof;
a clamp mechanism including a supporting member arranged on one of the surfaces of said disc-shaped recording medium, by having an intermediate portion passed through said center opening, for supporting an area of said one surface around said center opening, and a thrusting supporting member arranged on the other surface of said disc-shaped recording medium for supporting an area of said other surface around said center opening;
a disc rotating driving mechanism for rotationally driving said disc-shaped recording medium; and
a recording and/or reproducing head for performing recording and/or reproduction as it is floated a pre-set distance from a surface provided with a signal recording region of the rotating disc-shaped recording medium;
said clamp mechanism being mounted on said disc-shaped recording medium as it clamps an area of said disc-shaped recording medium radially outside of the outer perimeter of said center opening by at least 0.1 mm or more, said area being coplanar with each surface of the disc-shaped recording medium carrying said signal recording region;
wherein said disc rotating driving mechanism is detachably coupled to said clamp mechanism for rotationally driving said disc-shaped recording medium.

63. The disc drive apparatus according to claim 62, wherein said thrusting supporting member is formed by a plate spring member.

64. The disc drive apparatus according to claim 62, wherein
said intermediate portion comprises a center shank; and
a plurality of the disc-shaped recording mediums are arranged in tiers with the disc surfaces parallel to one another, there being a spacer between neighboring disc-shaped recording mediums, said spacer being passed through by said shank to support said disc-shaped recording mediums at a pre-set spacing from each other, said supporting member supporting the one surface of the lowermost disc-shaped recording medium, said thrusting supporting member supporting the other surface of the uppermost disc-shaped recording medium.

65. The disc drive apparatus according to claim 64 wherein said spacer has a cut-out which evades a projection produced around the perimeter of the center opening, said cut-out being formed radially inwardly of a supporting portion provided on an outer rim side for supporting said disc-shaped recording medium.

66. The disc drive apparatus according to claim 65, wherein said cut-out is spaced apart by not less than 0.02 mm from the surface of said disc-shaped recording medium.

67. The disc drive apparatus according to claim 65 wherein said supporting portion contacted with said disc-shaped recording medium has a maximum value of surface roughness of not larger than 4 μm.

68. The disc drive apparatus according to claim 65 wherein said supporting portion contacted with said disc-shaped recording medium has a maximum value of surface roughness of not larger than 4 μm.

69. The disc drive apparatus according to claim 65 wherein a coating material is applied to the supporting portion contacting with said disc-shaped recording medium.

70. The disc drive apparatus according to claim 69 wherein the coating material exhibits lubricating properties for improving slip with respect to the disc-shaped recording medium.

71. The disc drive apparatus according to claim 69 wherein said coating material exhibits resistance against friction.

72. The disc drive apparatus according to claim 64 wherein there is formed a gap between the intermediate portion and the center opening for prohibiting the intermediate portion from colliding against the lateral side of the center opening when the disc-shaped recording medium is contracted to reduce the size of the center opening.

73. The disc drive apparatus according to claim 72 wherein an eccentricity preventative member is mounted on said spacer intermediate between said center opening and the shank for evenly thrusting the lateral side of the center opening towards the outer periphery of the disc-shaped recording medium to prohibit eccentricity of the disc-shaped recording medium.

74. The disc drive apparatus according to claim 62, wherein said supporting member includes a cut-out for evading a projection produced around said center opening of the recording medium.

75. The disc drive apparatus according to claim 62, wherein said thrusting supporting member includes a substantially arcuate thrusting portion on its outer rim side for thrusting the to her surface of said disc-shaped recording medium.

76. A disc cartridge, comprising:

a main cartridge body unit;

a magnetic disc housed in said main cartridge body unit, said disc comprising a substrate molded from a synthetic resin and having a center opening and a signal recording region formed on at least one surface thereof;

a clamp mechanism coupled to said magnetic disc, said clamp mechanism including a supporting member arranged on one side of the magnetic disc and a thrusting supporting member arranged on the other side of the magnetic disc, said clamp mechanism being mounted to said magnetic disc by clamping an area of said disc located radially outside of an outer perimeter of the center opening between said supporting member and said thrusting supporting member, said supporting member having a cut-out formed radially inwardly of an outer support rim for accommodating a projection formed around the center opening of the magnetic disc.

* * * * *

UNITED STATES PATENT AND TRADEMARK OFFICE
CERTIFICATE OF CORRECTION

PATENT NO.      : 6,462,903 B1
DATED           : October 8, 2002
INVENTOR(S)     : Takashi Yamada et al.

It is certified that error appears in the above-identified patent and that said Letters Patent is hereby corrected as shown below:

<u>Column 38,</u>
Line 15, "thrusting the to her" should read -- thrusting the other --.

Signed and Sealed this

Fifth Day of August, 2003

JAMES E. ROGAN
*Director of the United States Patent and Trademark Office*